United States Patent [19]
Baxter

[11] Patent Number: 5,854,918
[45] Date of Patent: Dec. 29, 1998

[54] APPARATUS AND METHOD FOR SELF-TIMED ALGORITHMIC EXECUTION

[75] Inventor: Michael A. Baxter, Sunnyvale, Calif.

[73] Assignee: Ricoh Company Ltd., Tokyo, Japan

[21] Appl. No.: 590,499

[22] Filed: Jan. 24, 1996

[51] Int. Cl.$^6$ ................................................ G06F 1/04
[52] U.S. Cl. ................................................ 395/555
[58] Field of Search ...................... 395/555, 556, 395/559, 560, 800.1, 800.11, 800.15

[56] References Cited

U.S. PATENT DOCUMENTS

| | | | |
|---|---|---|---|
| 3,222,536 | 12/1965 | Witherspoon | 307/167 |
| 3,358,128 | 12/1967 | Oliver | 235/167 |
| 3,553,446 | 1/1971 | Kruy . | |
| 4,322,643 | 3/1982 | Preslar . | |
| 4,682,303 | 7/1987 | Uya . | |
| 4,707,800 | 11/1987 | Montotone et al. . | |
| 4,737,926 | 4/1988 | Vo et al. . | |
| 4,841,468 | 6/1989 | Miller | 364/754 |
| 4,876,660 | 10/1989 | Owen | 364/754 |
| 4,972,362 | 11/1990 | Elkind | 364/760 |
| 4,982,352 | 1/1991 | Taylor | 364/715.01 |
| 5,018,093 | 5/1991 | Shih . | |
| 5,038,117 | 8/1991 | Miller | 331/16 |
| 5,047,975 | 9/1991 | Patti et al. . | |
| 5,109,394 | 4/1992 | Hjerpe et al. | 375/119 |
| 5,117,386 | 5/1992 | Persoon et al. . | |
| 5,153,848 | 10/1992 | Elkind | 364/748 |
| 5,173,617 | 12/1992 | Alsup et al. | 307/269 |
| 5,175,453 | 12/1992 | Chang et al. | 307/603 |

(List continued on next page.)

OTHER PUBLICATIONS

Novak, Joe H. and Brunvand, Erik, "Using FPGAs to Prototype a Self–Timed Floating Point Co–Processor," 1994 IEEE Custom Integrated Circuits Conference, pp. 85–88.

Linder, Daniel, H., "Phase Logic: Supporting the Synchronous Design Paradigm with Delay–Insensitive Circuitry".

Abstracts on Automatic layout synthesis of leaf cells, High–performance disk I/O in a bus–based system, Access graph: a model for investigating memory consistency, Probe acquisition for the MSPARC hybrid monitor, An adaptive and fault tolerant wormhole routing strategy for k–ary n–cubes & A performance monitor for the MSPARC multicomputer.

Listing of miscellaneous reference text.

Efendovich, Avner et al., "Multi–Frequency Zero–Jitter Delay–Locked Loop", *IEEE 1993 Custom Integrated Circuits Conference,* 1993, pp. 27.1.1–27.1.4.

Horowitz, Mark et al., "TP 10.5 PLL Design for a 500 MB/s Interface", *1993 IEEE International Solid–State Circuite Conference/Digest of Technical Papers,* 1993, pp. 160 & 161.

(List continued on next page.)

*Primary Examiner*—Dennis M. Butler
*Attorney, Agent, or Firm*—Fenwick & West LLP

[57] ABSTRACT

An apparatus for self-timed algorithmic execution comprises a functional logic set, a reference clock input and a pulse sequencer. The functional logic set receives input data in synchrony with a reference pulse set received at the reference clock input; performs algorithmic computations on the input data at a maximal-rate set by the pulse sequencer in accordance with the physical characteristics of the functional logic; generates output data; and transmits the output data in synchrony with the reference pulse set. The maximal-rate set by the pulse sequencer is independent of the reference pulse set. A method for self-timed algorithmic execution comprises the steps of: transferring input data to a functional logic set in synchrony with a reference clock; generating a maximal-rate pulse sequence, for driving the functional logic set at a rate dependent upon an algorithm execution time for the functional logic set but independent of the reference clock; generating output data from the functional logic set in response to the maximal-rate pulse sequence; and transferring the output data from the functional logic in synchrony with the reference clock.

21 Claims, 19 Drawing Sheets

U.S. PATENT DOCUMENTS

| | | | |
|---|---|---|---|
| 5,450,607 | 9/1995 | Kowalcyzk | 395/800 |
| 5,483,478 | 1/1996 | Chiang | 364/787 |
| 5,502,403 | 3/1996 | Liu et al. | 326/46 |
| 5,509,040 | 4/1996 | Shimada | 377/117 |
| 5,511,173 | 4/1996 | Yamamura et al. | 395/375 |
| 5,511,181 | 4/1996 | Baxter | 395/551 |
| 5,553,276 | 9/1996 | Dean | 395/550 |
| 5,566,079 | 10/1996 | Jun et al. | 364/491 |
| 5,566,123 | 10/1996 | Freidin et al. | 365/230.05 |
| 5,576,982 | 11/1996 | Wu et al. | 364/715.1 |
| 5,710,910 | 1/1998 | Kehl et al. | 395/551 |

OTHER PUBLICATIONS

Johnson, Mark, G. and Hudson, Edwin L., "A Variable Delay Line PLL for CPU–Coprocessor Synchronization", *IEEE Journal Of Solid–State Circuits,* vol. 23, No. 5 Oct. 1988, pp. 1218–1223.

Lee, Thomas, H. et al., "a 2.5 V CMOS Delay–Locked Loop for an 18 Mbit, 500 Megabyte/s DRAM", *IEEE Journal of Solid–State Circuits,* vol. 29, No. 12, Dec. 1994, pp. 1491–1496.

Waizman, Alex, "FA18.5: A Delay Line Loop for Frequency Synthesis of De–Skewed Clock", 1994 *IEEE International Solid–State Circuite Conference/Digest of Technical Papers,* 1994, pp. 298 & 299.

Pechoucek,Miroslav "Anamalous Response Times of Input Synchronizers" *IEEE Transactions on Computers, vol. C–25, No. 2, Feb. 1976* pp. 133–139.

Wilkinson, Barry "Comments on Design and Analysis of Arbitration Protocols" *IEEE Transactions on Computers* vol. 41, No. 3, Mar. 1992 pp. 348–351.

Calvo,J. Acha J.I. and Valencia M, "Asynchronous Modular Arbiter" *IEEE Transactions on Computers,* vol. C–35, No. 1, Jan. 1986 pp. 67–70.

Guibaly, Fayez El "Design and Analysis of Arbitration Protocols" *IEEE Trasactions on Computers,* vol. 38, No. 2, Feb. 1989 pp. 161–171.

Chapiro, Daniel M, "Reliable High–Speed Arbitration and Synchronization" *IEEE Transactions of Computers,* vol. C–36, No. 10, Oct. 1987 pp. 1251–1255.

Rosenberger, Fred, "Q–Modules: Internally Clocked Delay–Insensitive Modules" *IEEE Transactions on Computers,* vol. 37, No. 9, Sep. 1988 pp. 1005–1017.

McConnel, Stephen R. And Sieworek, Daniel P., "Synchronizationand Voting" *IEEE Transactions on Computers,* vol. C–30, No. 2, Feb. 1981 pp. 161–164.

Meng, Teresa H., *Synchronization Design for Digital Systems* pp. 92–118.

Mahewsaran, Kapilan, "Implementing Self–Timed Circuits in Field Programmable Gate Arrays" Thesis for Master of Science in Electrical and Computer Engineering, Office of Graduate Studies, University of California, Davis. 1995 pp. 1–80.

Payne, Rob, Dept. Of Computer Science, University of Edinburgh, "Self–Timed FPGA Systems" pp. 1–12.

Brown, Chappell, "Fourier transform ported to PFGAs" *Electronic Engineering Times, Nov. 13, 1995* pp. 53–54.

Xilinx, application Note by Greg Goslin & Bruce Newgard."16 Tap, 8–Bit FIR Filter Applications Guide" Nov. 21, 1994.

*IEEE Computer Society Technical Committee on Computer Architecture Newsletter,* Oct. 1995. Special issue on Asynchronous Computer Architecture pp. 1–44.

E–Mail Correspondence, M. Baxter@eworld.com Wed Oct 18 22:13:15 1995.

Internet Search on Term: "Asynchronous Systems Research Group" Feb. 1, 1996, pp. 1–3.

Professor Vankatesh Akella, "Asynchronous Systems Research Group", Department of Electrical and Computer Engineering, University of California, Davis, akella@ece.ucdavis.edu.

Unger, Stephen H., "Asynchronous Sequential Switching Circuits", Krieger Publishing Co. Inc. 1983, pp. 118–253.

Xilinx, "Field Programmable Gate Array Family" XC4000E, Jul. 27, 1995 (Version 0.9).

| FIG. 9A-1 |
|-----------|
| FIG. 9A-2 |
| FIG. 9A-3 |

*FIG. 9A-3*

| 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|
| | | | | | | | | | | | | 5 | 2 | 1 | 0 | |
| | | | | | | | | | | 13 | 8 | 6 | 3 | | | |
| | | | | | | | | 25 | 18 | 14 | 9 | | | | | I |
| | | | | | | 39 | 32 | 26 | 19 | | | | | | | |
| | | | | | | | | | | 15 | 10 | 7 | 4 | | | |
| | | | | | | | | 27 | 20 | 16 | 11 | | | | | II |
| | | | | | | | | 40 | 33 | 28 | 21 | | | | | |
| | | | | | 51 | 46 | 41 | 34 | | | | | | | | |
| | | | | | | | | 29 | 22 | 17 | 12 | | | | | |
| | | | | | | | 42 | 35 | 30 | 23 | | | | | | III |
| | | | | | | 52 | 47 | 43 | 36 | | | | | | | |
| | | | | | 59 | 56 | 53 | 48 | | | | | | | | |
| | | | | | | | 44 | 37 | 31 | 24 | | | | | | |
| | | | | | | 54 | 49 | 45 | 38 | | | | | | | IV |
| | | | | | 60 | 57 | 55 | 50 | | | | | | | | |
| | | | 63 | 62 | 61 | 58 | | | | | | | | | | |

FIG. 9B

APPARATUS AND METHOD FOR SELF-TIMED ALGORITHMIC EXECUTION

This application relates to U.S. patent application Ser. No. 08/501,970, entitled *System and Method for Phase-Synchronous, Flexible-Frequency Clocking and Messaging*, filed on Jul. 21, 1995, now U.S. Pat. No. 5,805,871.

BACKGROUND OF THE INVENTION

1. Field of the Invention

The present invention relates generally to apparatus and methods for generating internal timing signals for high-speed computer systems. More particularly, the present invention is an apparatus and method for self-timed algorithmic execution, which is not rigidly synchronized to a master time base.

2. Description of the Background Art

In high-speed computer systems, there is a need for a master time base to pace various necessary switching activities. In some computer systems, one unitary clock signal is rebuffered through several clock amplifiers to act as the lone source of timing synchronization for all of the memory devices employed in the system. In other systems, several additional differently phased clock signals may be used to drive separate sets of memory devices, yet all are conventionally synchronized to the master time base in the system.

If multiple clocking signals are used, the different memory devices toggle or change state with data streams or instruction sequences at relatively different rates. Such multiply clocked circuits are often designed such that functional logic between the memory devices may cycle, at it's fastest possible rate. In pipelined systems, for instance, the functional logic is apportioned among the memory devices so that a system-design constraint of a target minimum execution time is maintained without a co-constraining increase in the number of functional logic or memory device elements.

In some pipelined systems, a superharmonic clock is used to pace the internal ranks of certain pipelined functional units at a faster rate while the input-output boundaries of the functional unit are paced at a slower rate compatible with the rest of the pipelined functional units in the system. This prior art method is known as "micropipelining" and involves apparatus in which the inner memory devices of a pipelined functional unit have a strictly synchronous superharmonic clock signal that interleaves the microoperations of the pipeline synchronism with the slower stream rate experienced at the input-ports and output-ports of the pipeline. Unfortunately, micropipelining's drawbacks include requiring several clock amplifiers in a low-skew tree organization, to ensure a lowest possible skew in the triggering signal actually received by each of the memory devices, and requiring a unitized timing interval. Thus, sets of logic elements within a micropipeline that do not have propagation delays short enough to operate within the unitized timing interval are difficult to accommodate. Furthermore, micropipelining concepts are particularly difficult to implement using reconfigurable logic devices (RLDs), such as Field Programmable Gate Arrays (FPGAs), since the propagation delays within an RLD vary from functional unit to functional unit making it difficult to have a semi-global micropipeline clock.

Conventionally, when RLDs have been used to implement various logic designs, the majority of "tools" used to generate the actual RLD interconnections employ a Register Transfer Language (RTL) paradigm. Such a paradigm relies heavily on the existence of separate master time base clocks for driving the functional logic and memory devices within the RLD. Such a paradigm also ignores the effects that the physical implementation of the logic design within the RLD will have on the logic design's overall timing performance and silicon resource requirements. In fact, RLD tool manufacturers often claim that an "advantage" of their logic design paradigm is that it is not tailored to the RLD's physical characteristics.

Other high-speed computer systems have attempted to avoid the above mentioned difficulties associated with master time based synchronized clocking systems by dividing a computer's functional tasks into a set of asynchronously timed sub-tasks. Unfortunately, existing asynchronous logic designs also possess many limitations such as: being required to generate "completion signals" upon completing their operational tasks; having variable or unknown completion times; requiring external clocking elements; having data-dependent completion times; asynchronously interfacing with external circuitry; incoherently phasing data exchanges with external circuitry; delay added to the external clocking circuitry adds additional system wide complexity; being difficult to encapsulate within synchronous external circuitry; and tying total system wide performance to the network of external clocking circuits.

What is needed is an apparatus and method for self-timed algorithmic execution which separates the burden inherent in achieving the fastest possible pipeline frequencies from the simultaneous burden of having the shortest possible interstage delay constraints within a system that employs unitized timing intervals.

SUMMARY OF THE INVENTION

The present invention is an apparatus and method for self-timed algorithmic execution. The apparatus of the present invention preferably comprises a functional logic set, a reference clock input and a pulse sequencer. The functional logic set receives input data in synchrony with a reference clock received at the reference clock input; performs algorithmic computations on the input data at a maximal-rate determined by the pulse sequencer in accordance with the physical characteristics of the functional logic set; generates output data; and transmits the output data in synchrony with the reference clock. The maximal-rate set by the pulse sequencer is independent of the reference clock.

The method of the present invention preferably comprises the steps of: transferring input data to a functional logic set in synchrony with a reference clock; generating a maximal-rate pulse sequence, for driving the functional logic set at a rate dependent upon an algorithm execution time for the functional logic set but independent of the reference clock; generating output data from the functional logic set in response to the maximal-rate pulse sequence; and transferring the output data from the functional logic in synchrony with the reference clock.

BRIEF DESCRIPTION OF THE DRAWINGS

FIG. 9B is a matrix showing preferred partial product additions for an 8-bit by 8-bit multiplication of the present invention;

DETAILED DESCRIPTION OF THE PREFERRED EMBODIMENT

Figure 1:
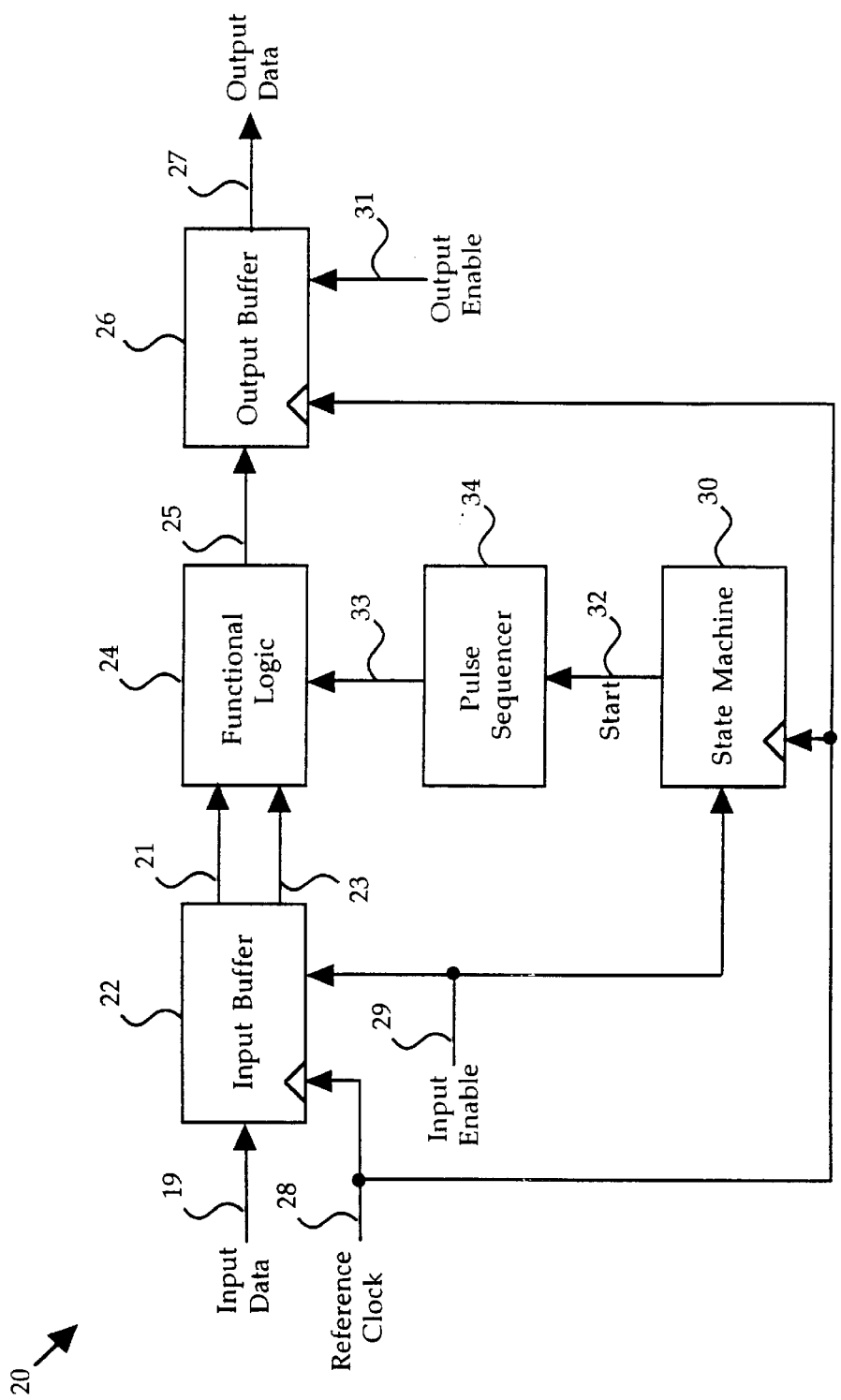
FIG. 1 is a block diagram of a preferred embodiment of an apparatus for self-timed algorithmic execution.

The present invention is an apparatus and method for self-timed algorithmic execution. By pairing a delay unit with a functional logic set designed to execute a selected algorithm, the present invention executes the selected algorithm at its fastest possible speed independent of any reference clocks which drive other functional logic sets. Thus, in contrast with known timing apparatus and methods, timing characteristics of any functional logic set which implements the algorithm need not be either constrained by or dependent upon a reference clock's speed. Instead, the present invention: first, accepts data from other functional logic sets; second, operates upon the data at a self-timed rate based upon a functional logic set which implements the algorithm in response to the generation of a set of self-timed pulses; and third, outputs data by a specific known time to be accepted by the other functional logic sets. As a result, the apparatus and method of the present invention is particularly advantageous over the prior art because it enables one functional logic set to operate at a speed independent of the operational speed of other functional logic sets or reference clocks, thus simplifying hardware design while maintaining the fastest possible algorithmic execution speeds.

The present invention achieves these advantages by viewing functional logic sets in terms of their most fundamental physical structures. The present invention does not rely upon a Register Transfer Logic (RTL) paradigm. Rather, the present invention tailors a unique timing circuit to a functional logic set which implements an algorithm so that the functional logic set may operate at its fastest possible rate. Thus, the present invention defines a new paradigm for implementing logic designs within silicon resources by viewing the silicon resources as incremental arbiters not only of algorithmic execution but also of timing rates. The prior art is unaware of this new paradigm because: first, the temporal impact of logic implementation in prior art systems hinges on the side-effects seen at the memory devices only; second, functional logic sets are mechanistically viewed in the prior art as conduits for passing data whereas in fact, the functional logic set can also be viewed as an opportunity for reducing a functional logic set's overall execution time; third, the RTL paradigm discourages the analysis of beneficial or integral interconnect effects between the functional logic and memory devices; and fourth, the prior art's emphasis on functional logic strongly discourages designs which incorporate localized feedback for generating individualized timing circuits at any level of algorithmic implementation.

The present invention is preferably embodied in a Reconfigurable Logic Device (RLD), such as a Xilinx XC4000 series (Xilinx, San Jose, Calif.) Field Programmable Gate Array (FPGA). RLDs are comprised of a set of Configurable Logic Blocks (CLBs). Each CLB preferably includes at least one function generator, as well as one or more carry logic elements. As known by those skilled in the art, the FPGA's internal structure is dynamically reconfigurable through the use of a configuration data set, or configuration bit-stream. Within any given CLB, particular logic functions are generated via the function generators, in accordance with the configuration bit-stream. Each function generator has a characteristic, stable signal propagation delay. For example, within a Xilinx XC4000 series CLB, a first and second function generator (types "F" and "G") each have a propagation delay of approximately 4.5 nanoseconds (ns); and a third function generator (type "H") has a propagation delay of approximately 2.5 ns. Those skilled in the art will recognize that the carry logic elements typically comprise carry-propagate logic designed to have very small, stable propagation delays. The carry-propagate logic within a Xilinx XC4000 series FPGA has a propagation delay of 1.5 ns.

The present invention creates multiple levels of feedback by selectively combining resources within the RLD to produce various internal propagation delays. This feedback is used to create individual timing circuits for driving one or more functional logic sets within the RLD. Preferably, the present invention utilizes "inertial" delays rather than solely relying upon "pure" delays. An inertial delay is defined as a delay for which propagation requires a minimum pulse width, while a pure delay is one for which delay propagation is essentially pulse width independent. Advantageously, inertial delays are stable, well-controlled delays. Those skilled in the art will recognize that the present invention need not be embodied within an RLD, but instead may be constructed of other conventionally known logic devices.

While this specification discloses a functional logic set which implements an X-bit by Y-bit multiplication yielding a P-bit product (where X, Y and P are integers), those skilled in the art will recognize that the functional logic set could also be designed to execute a wide variety of alternative algorithms. Such alternative algorithms may include steps for performing any type of arithmetic, logical, graphical, word-processing, signal-processing or network operations. For example, this invention may be used to provide timing signals for the efficient use of an RLD's internal Random Access Memory (RAM), multiple port register files, or data path routing within an RLD (e.g., cross-bar switches within an FPGA).

For the sake of clarity, FIGS. 3 through 7 below show the details of an exemplary 16-bit by 16-bit multiplication yielding a 32-bit product. However, those skilled in the art will recognize that the present invention may be used to implement multiplications of greater or less than 16-bits. Also, for the remainder of this specification, the signals and bits described below preferably have only two states, logic "1" and logic "0." While the elements of the present invention will be described as responding only to rising edge of a state transition (i.e. a logic "0" to logic "1" transition), those skilled in the art will recognize that the RLD may be configured to respond to either only falling edge or both rising and falling edge state transitions.

Referring now to FIG. 1, a block diagram of a preferred embodiment of an apparatus 20 for self-timed algorithmic execution is shown. The apparatus 20 comprises an input buffer 22, functional logic 24, an output buffer 26, a synchronous state machine 30, and a pulse sequencer 34. The input buffer 22 is a conventionally known device that loads either an X-bit multiplicand or a Y-bit multiplier received over line 19 from external circuitry (not shown) each time the external circuitry holds an input enable signal on line 29 in a logic "1" state while receiving a reference clock signal on line 28. The reference clock is preferably implemented using a clocking mechanism described in U.S. patent application Ser. No. 08/501,970, entitled *System and Method for Phase-Synchronous, Flexible-Frequency Clocking and Messaging*. Those skilled in the art will recognize that any conventionally known clock generation means may instead provide the reference clock.

The input buffer 22 outputs the X-bit multiplicand over line 21 and the Y-bit multiplier over line 23 to the functional logic 24. The functional logic 24 receives the multiplicand and multiplier and multiplies them according to a multiplication algorithm, at a timing rate dependent upon the pulse sequencer 34 but independent of the reference clock. The time required by the functional logic 24 to perform the multiplication algorithm is its algorithm execution time. The propagation delays within the functional logic 24 determine its algorithm execution time and are conventionally calculated based on a set of logic devices of which it is comprised. The functional logic 24 outputs a P-bit product over line 25 to the output buffer 26. Details on the functional logic 24 are provided below with reference to FIG. 3. The output buffer 26 is of a type conventionally known, which loads and then outputs the P-bit product to the external circuitry over line 27 each time the external circuitry holds an output enable on line 31 in a logic "1" state while receiving the reference clock on line 28.

Figure 8:
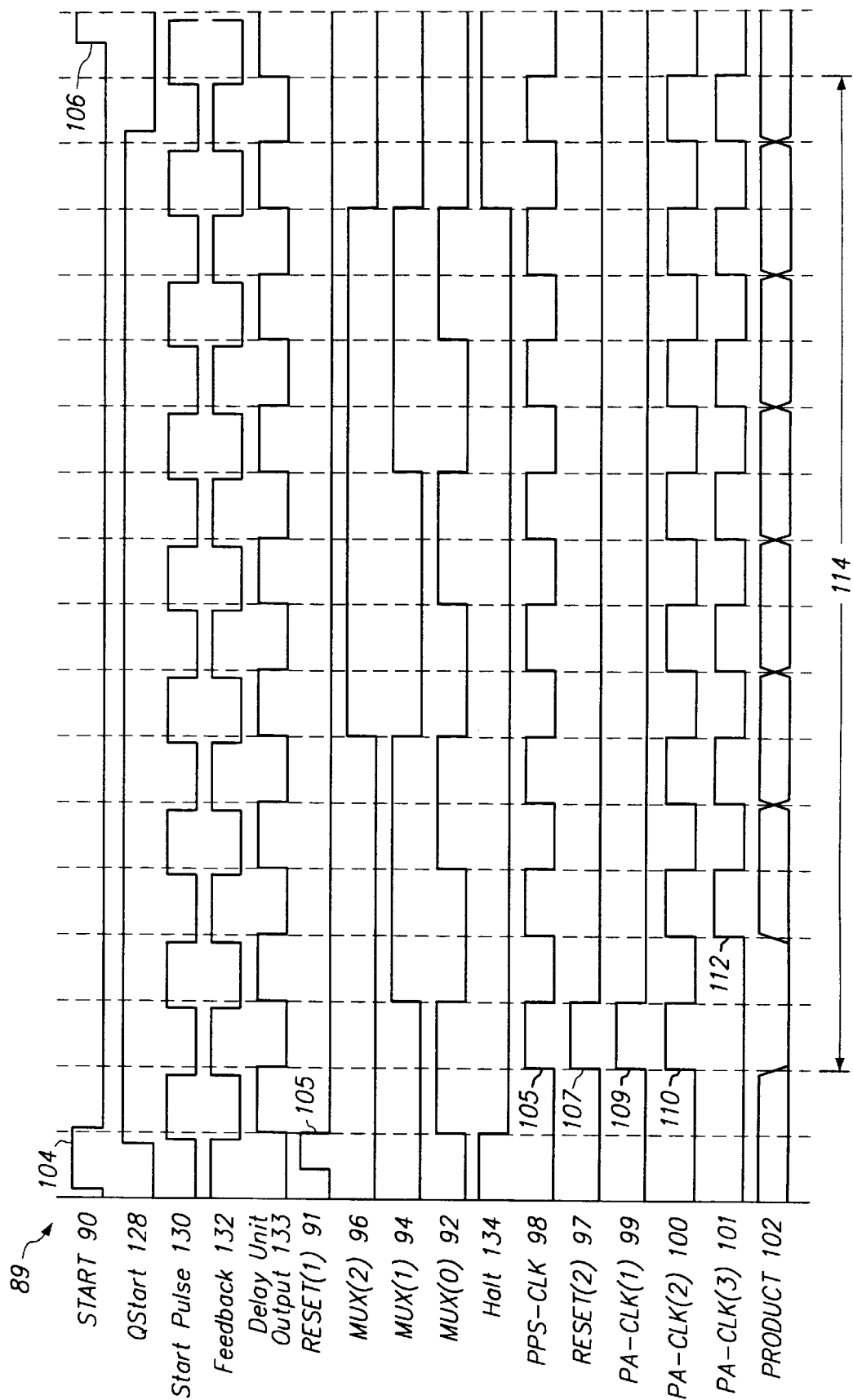
FIG. 8 is a preferred timing diagram showing the operation of the present invention.

The synchronous state machine 30 is of a type known in the art which transitions a start signal 90 (ref. FIG. 8) to logic "1" on line 32 after the reference clock on line 28 has toggled twice and the external circuitry has simultaneously held the input enable on line 29 in a logic "1" state. The synchronous state machine 30 waits for two reference clock toggles before setting the start signal 90 to logic "1" so that the input buffer 22 can sequentially receive both the X-bit multiplicand and the Y-bit multiplier from the external circuitry.

The pulse sequencer 34 monitors the start signal 90 on line 32 from the synchronous state machine 30, and in turn generates and sends a set of signals over line 33 to the functional logic 24 when the start signal 90 transitions to logic "1." Details of the pulse sequencer's 34 operation and the set of signals it outputs are described below with reference to FIG. 2A. Once the apparatus 20 is embodied in a physical device, or designed according to the constraints of a given physical device, the propagation delays of the functional logic 24 and a timing rate of the pulse sequencer 34 will be known. Thus, the output data will be present at the output buffer 26 within a known time from when the input data is clocked into the input buffer 22. This known time, however, varies slightly due to the physical device's normal performance variations as a function of device temperature and device aging. However, since the pulse sequencer 34 is preferably an integral part of the functional logic 24, as described below, both the pulse sequencer 34 and the functional logic 24 undergo the same temperature and time variations. As a result, the pulse sequencer 34 and the functional logic 24 are highly matched and the pulse sequencer 34 neither "over-clocks" nor "under-clocks" the functional logic 24.

Figure 2A:
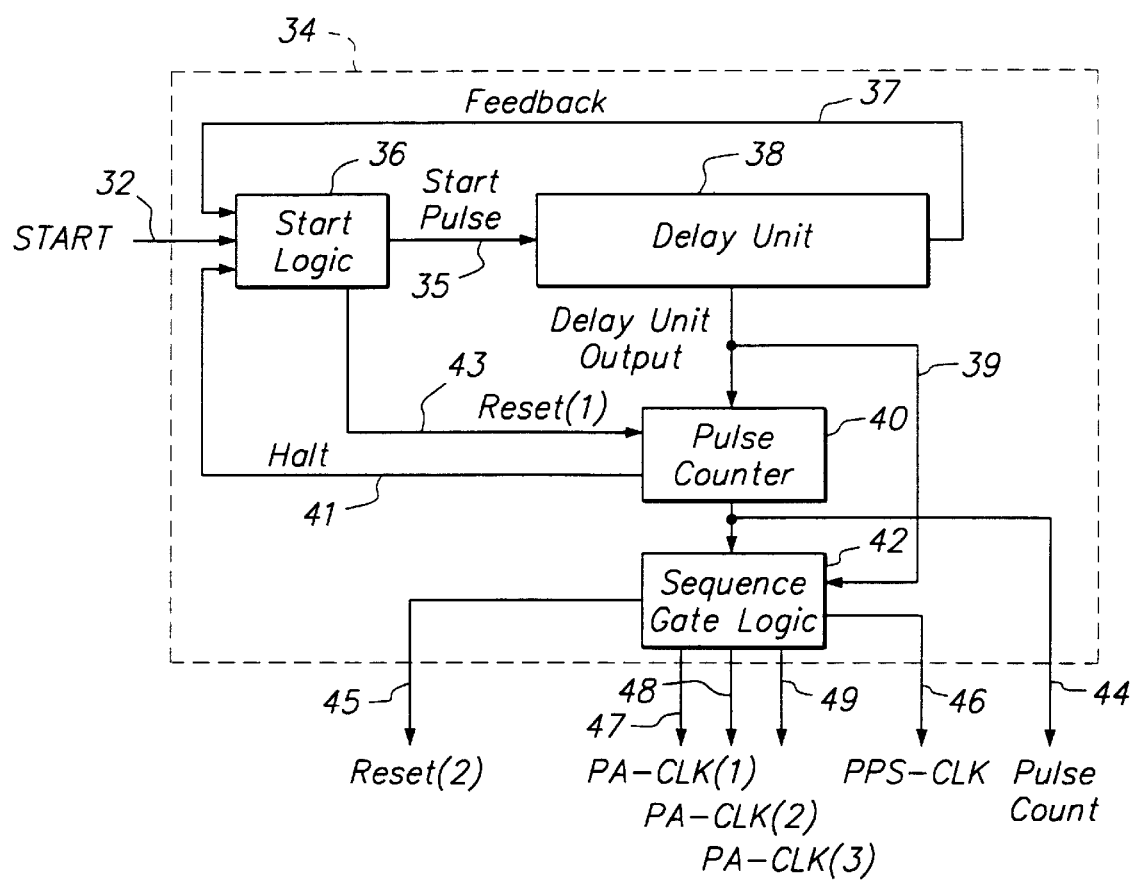
FIG. 2A is a block diagram of a preferred embodiment of a pulse sequencer of the present invention.

Referring now to FIG. 2A, a block diagram of a preferred embodiment of the pulse sequencer 34 of the present invention is shown. The pulse sequencer 34 comprises start logic 36, a delay unit 38, a pulse counter 40, and sequence gate logic 42. The pulse sequencer's 34 pulse rate, pulse duration and pulse periodicity (if any) are preferably optimized for the functional logic 24 which it drives. The pulse sequencer 34 is also preferably implemented using logic devices proximate to the functional logic 24 so as to similarly respond to temperature and aging effects, as discussed above. While only one pulse sequencer 34 is described below as driving the entire set of functional logic 24, alternatively, multiple pulse sequencers 34 could be designed to drive specific subsets of the functional logic 24 at different rates and at different times during the functional logic's 24 operation. In such an alternative embodiment, each of the multiple pulse sequencers 34 would preferably receive the start pulse 104.

When the start signal 90 transitions to logic "1" on line 32, the start logic 36 generates a Reset(1) pulse 105 (ref. FIG. 8) on line 43 and a start pulse on line 35. The Reset(1) pulse 105 initializes the pulse counter 40. Details of the start logic 36 are provided below with reference to FIG. 2B. The delay unit 38 receives the start pulse, and after a first known delay generates a delay unit output signal 133 (ref. FIG. 8) on line 39. After a second known delay, the delay unit 38 generates a feedback signal 132 (ref. FIG. 8) on line 37. Details of the delay unit 38 are provided below with reference to FIG. 2C. The start logic 36 receives the feedback signal 132 via line 37, and in turn generates a next start pulse on line 35, thus creating a self-timed oscillation. The period of this self-timed oscillation is defined by the propagation delays associated with the start logic 36, the delay unit 38, and line 37. Preferably, the start logic 36 and the delay unit 38 are physically placed within an RLD such that the propagation delay associated with line 37 is minimized. In an exemplary embodiment using a Xilinx XC4000 series FPGA, the delay associated with line 37 ranges between 1.7 and 2.2 ns when conventional placement directives are used to define CLB placements. Upon receiving a halt signal on line 41 from the pulse counter 40, the start logic 36 stops generating start pulses on line 35, thus halting the self-timed oscillation.

The pulse counter 40 receives the delay unit output signal 133 on line 39 and in response generates a pulse count on line 44, and the halt signal on line 41. The pulse count is reset over line 43 to an initial pulse count (preferably one) and increments each time the delay unit output signal 133 toggles. Once the pulse count reaches a largest pulse count, the pulse counter 40 generates the halt signal on line 41. Line 44 is comprised of a number of binary bit lines sufficient to transmit the largest pulse count. For example, in a 16-bit by 16-bit multiplication the pulse count requires eight states for reasons to be described below. Thus, line 44 must be comprised of at least three binary bit lines, defined herein as MUX(0) 92 (the Least Significant Bit (LSB)), MUX(1) 94, and MUX(2) 96 (the Most Significant Bit (MSB)) (ref. FIG. 8). Details on the pulse counter 40 are provided below with reference to FIG. 2D.

The sequence gate logic 42 receives the pulse count over line 44 and the delay unit output signal 133 over line 39. In response, the sequence gate logic 42 generates a Reset(2) signal 97 (ref. FIG. 8) on line 45, a partial product summer clock signal (PPS-CLK) 98 (ref. FIG. 8), a product accumulator clock(1) signal (PA-CLK(1)) 99 (ref. FIG. 8) on line 47, a PA-CLK(2) 100 (ref. FIG. 8) on line 48, and a PA-CLK(3) 101 (ref. FIG. 8) on line 49. Each CLK 98, 99, 100, 101 is preferably a square wave signal derived from the pulse count and the delay unit output signal 133. The pulse count signal 44, the Reset(2) signal 97, the PPS-CLK 46, and the PA-CLKs 47, 48, 49 together function as the set of signals output on line 33 to the functional logic 24, as shown in FIG. 1. However, in accordance with the self-timed paradigm, none of the set of signals output on line 33 are purposely synchronized to the reference clock on line 28. Details on the sequence gate logic 42 are provided below with reference to FIG. 2E.

Figure 2B:
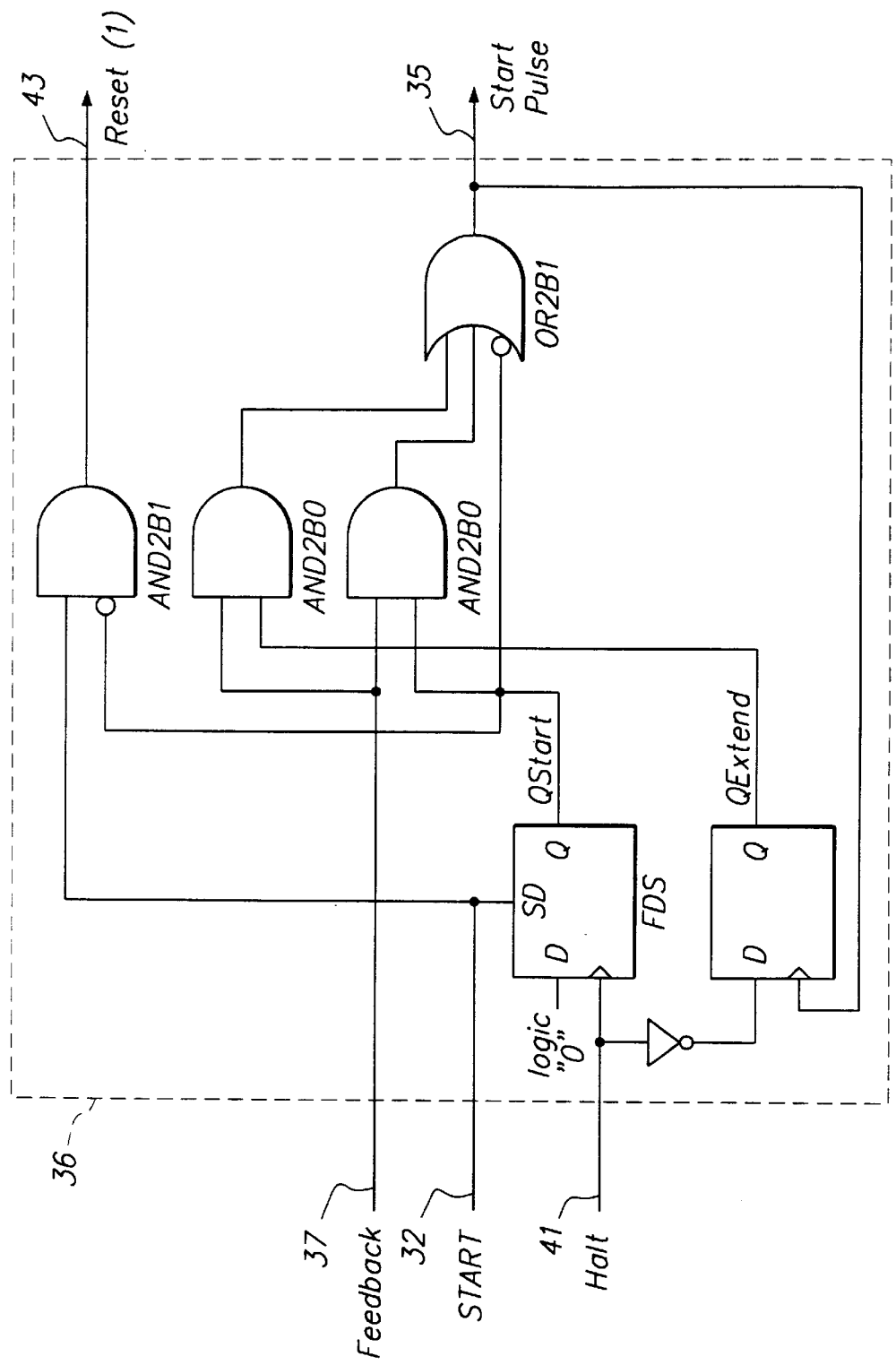
FIG. 2B is a block diagram of a preferred embodiment of start logic within the pulse sequencer.

Referring now to FIG. 2B, a block diagram of a preferred embodiment of start logic 36 of the present invention is shown. The start logic 36 comprises a set of logic devices operationally coupled as shown in FIG. 2B. In an exemplary embodiment realized using a Xilinx XC4000 series FPGA, the start logic 36 comprises conventional Xilinx library elements FDS, AND2B1, AND2B0 and OR2B1.

Figure 2C:
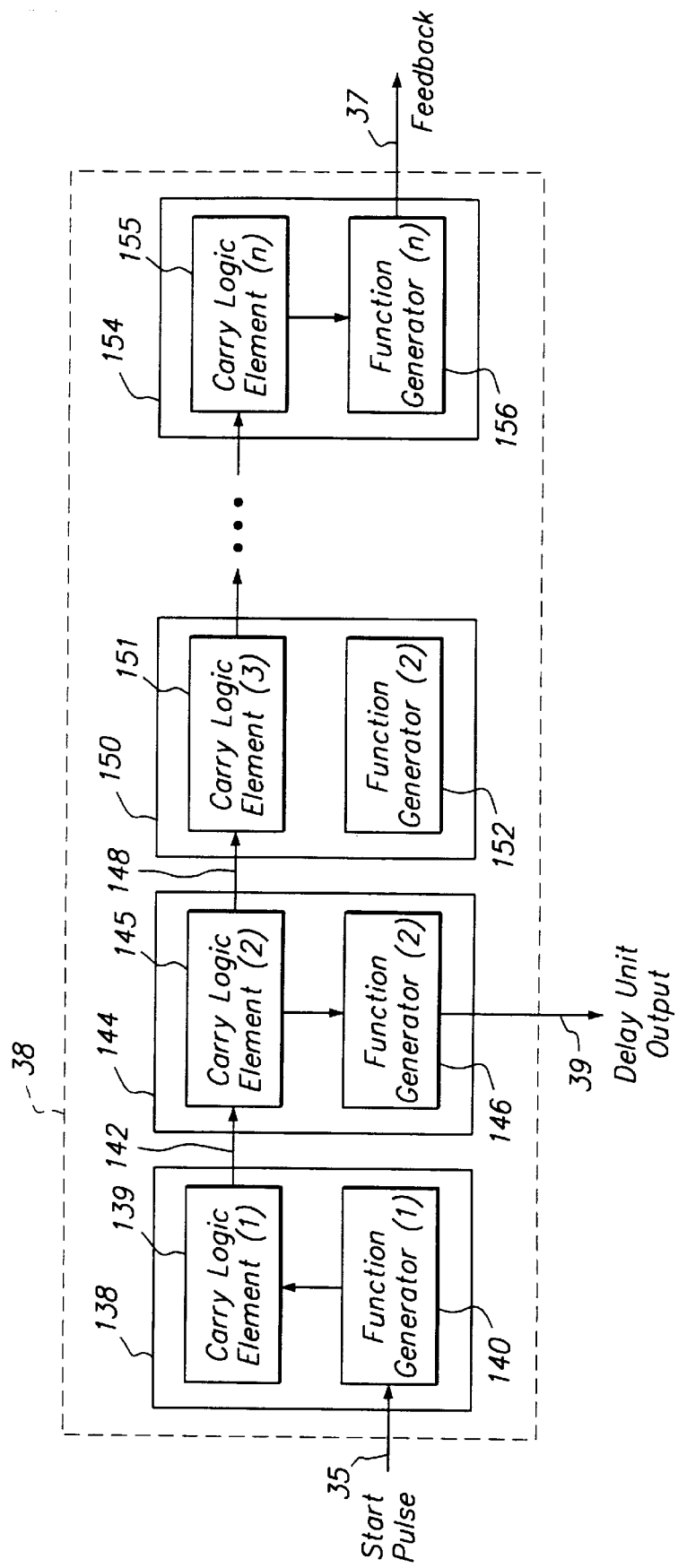
FIG. 2C is a block diagram of a preferred embodiment of a delay unit within the pulse sequencer.

Referring now to FIG. 2C, a block diagram of a preferred embodiment of the delay unit 38 of the present invention is shown. The delay unit 38 is preferably embodied within an RLD and is comprised of carry logic elements within a set of "n" CLBs 138, 144, 150, 154, where n is an integer. Preferably, each carry logic element comprises high-speed carry-propagate circuitry. The delay unit 38 additionally comprises a subset of the function generators within this set of n CLBs, to facilitate signal routing between the delay unit 38 and logic external to the delay unit 38, namely, the start logic 36, the pulse counter 40, and the sequence gate logic 42. In an exemplary embodiment, the delay unit 38 is implemented in a Xilinx XC4000 series FPGA through the use of "EXAMINE CI" and "FORCE CI" directives, corresponding to examining and forcing a carry-in signal, respectively.

The logic utilized within each CLB 138, 144, 150, 154 adds a known delay (1.5 ns for a Xilinx XC4000 carry logic element and 4.5 ns for a Xilinx XC4000 F-type function generator) to the delay unit 38. The delay unit's 38 frequency of operation is preferably varied by either increasing or decreasing the number of carry logic elements connected in series. In the preferred embodiment, a maximal rate self-timed pulse sequencer 34 is desired. The number of CLBs 138, 144, 150, 154 comprising the delay unit 38 is therefore dependent upon a slowest portion of the functional logic 24. As a result, if the slowest portion of the functional logic 24 takes "t" ns to execute, then "n" CLBs having a total delay equal to one-half "t" ns (i.e. one-half the period) preferably comprises the delay unit 38. Also, due to an RLD's ability to be reprogrammed real-time, the delay of the delay unit 38 may be dynamically varied during the course of the functional logic's 24 processing operations. This enables a first set of functional logic 24 operations to be performed at a first self-timed rate, a second set of functional logic 24 other operations to be performed at a second self-timed rate, and so on.

Within a first CLB 138, function generator (1) 140 receives the start pulse on line 35, and passes the pulse to carry logic element (1) 139. Carry logic element (1) 139 then passes the pulse over carry-out line 142 to a second CLB 144. Within the second CLB 144, carry logic element (2) 145 receives the pulse and passes it to function generator (2) 146, and also transfers the pulse over carry-out line 148 to a third CLB 150. Passing the pulse to function generator (2) 146 enables the pulse to be "tapped" from the delay unit 38 at that point so as to become the delay unit output signal 133 on line 39. Herein, a "tap" is defined as a coupling within the delay unit 38 that facilitates signal routing external to the delay unit 38. This "tapping" may alternatively occur at a different location within the delay unit 38 or may occur in several places, depending upon the set of functional logic 24 being implemented. The exact position within the delay unit 38 where line 39 is tapped is preferably chosen such that the signals generated on line 33 by the pulse sequencer are phase-aligned with respect to the external circuitry (not shown) that initiates the operation of the apparatus 20, as discussed with reference to FIG. 1.

Within the third CLB 151, carry logic element (3) 151 receives the pulse and passes it to a carry logic element within a next CLB, and so on until the pulse is passed to carry logic element (n) within an "nth" CLB 154. Any CLBs between the third CLB 150 and the "nth" CLB 154 are preferably of the same construction and have preferably the same interface as the third CLB 150. Within the third CLB 151, function generator (3) 152 is not required for the operation of the delay unit 38 because the third CLB 151 is not being tapped to route the pulse to a destination external to the delay unit 38. Thus, function generator (3) 152 may be advantageously used to implement part of the functional logic's 24 operations.

Within the nth CLB, carry logic element (n) 155 receives the pulse and passes it to function generator (n) 156, which inverts the pulse and outputs the inverted pulse on line 37 as the feedback signal 132. It is via this pulse inversion that the self-timed oscillator transitions between logic "1" and logic "0." Those skilled in the art will recognized that the pulse could have been inverted by function generator (1) 140 instead.

The delay unit's 38 frequency of operation may be varied by increasing or decreasing the number of carry logic elements coupled in series (i.e. by varying the value of "n"). In an alternate embodiment "n" could be zero, resulting in the start pulse, the feedback signal 132 and the delay unit output signal 133 becoming the same signal. In yet another alternate embodiment, the delay unit's 38 frequency of operation could be varied by additional signal routing through one or more function generators. In still another alternate embodiment, the delay unit's 38 frequency of operation could be modified or adjusted using signal routing resources within the RLD that have well-defined delay characteristics. Those skilled in the art will recognize that the delay unit 38 may be embodied in non-reconfigurable devices, using logic in which individual elements have a known maximum signal propagation delay.

Figure 2D:
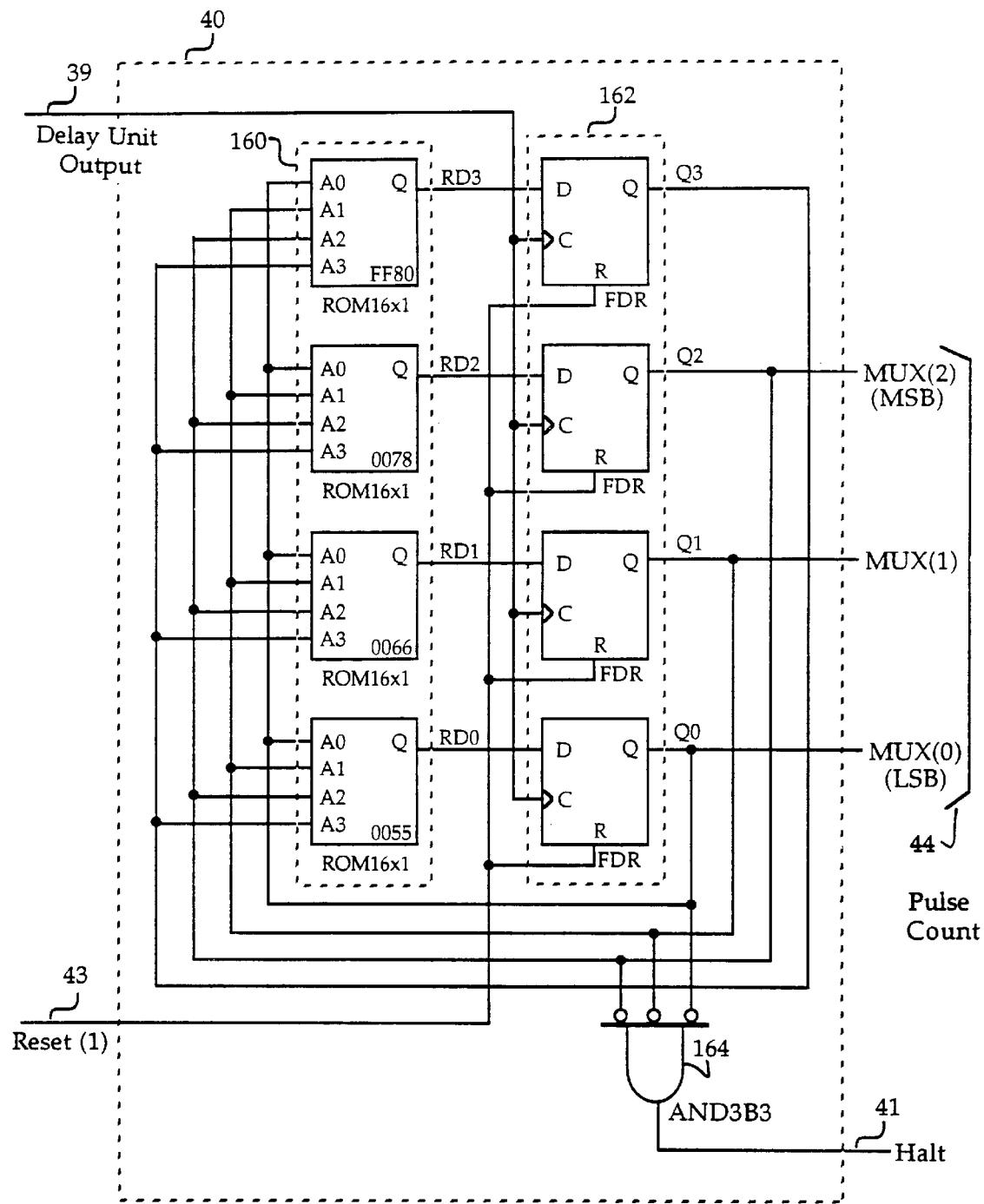
FIG. 2D is a block diagram of a preferred embodiment of a pulse counter within the pulse sequencer.

Referring now to FIG. 2D, a block diagram of a preferred embodiment of the pulse counter 40 of the present invention is shown. The pulse counter 40 is comprised of a set of logic devices 160, 162, 164 (preferably created in a Xilinx XC4000 series FPGA using the library elements ROM16x1, FDR, and AND3B3) operationally coupled as shown in FIG. 2D. The ROMs 160 are joined together with flip-flops 162 to implement the pulse count. A present state code Q3, Q2, Q1, Q0 of the flip-flops 162 is used to produce the pulse count, with one present state code corresponding to the halt signal 134. The pulse counter 40 increments until the Reset (1) pulse 105 is received on line 43. The codes to be stored in the ROM's 160 are generated from the following present-state/next-state table:

| Present-State | | | | Next-State | | | |
|---|---|---|---|---|---|---|---|
| Q3 | Q2 | Q1 | Q0 | RD3 | RD2 | RD1 | RD0 |
| 0 | 0 | 0 | 0 | 0 | 0 | 0 | 1 |
| 0 | 0 | 0 | 1 | 0 | 0 | 1 | 0 |
| 0 | 0 | 1 | 0 | 0 | 0 | 1 | 1 |
| 0 | 0 | 1 | 1 | 0 | 1 | 0 | 0 |
| 0 | 1 | 0 | 0 | 0 | 1 | 0 | 1 |
| 0 | 1 | 0 | 1 | 0 | 1 | 1 | 0 |
| 0 | 1 | 1 | 0 | 0 | 1 | 1 | 1 |
| 0 | 1 | 1 | 1 | 1 | 0 | 0 | 0 |
| 1 | 0 | 0 | 0 | 1 | 0 | 0 | 0 |
| 1 | 0 | 0 | 1 | 1 | 0 | 0 | 0 |
| 1 | 0 | 1 | 0 | 1 | 0 | 0 | 0 |
| 1 | 0 | 1 | 1 | 1 | 0 | 0 | 0 |
| 1 | 1 | 0 | 0 | 1 | 0 | 0 | 0 |
| 1 | 1 | 0 | 1 | 1 | 0 | 0 | 0 |
| 1 | 1 | 1 | 0 | 1 | 0 | 0 | 0 |
| 1 | 1 | 1 | 1 | 1 | 0 | 0 | 0 |

Figure 2E:
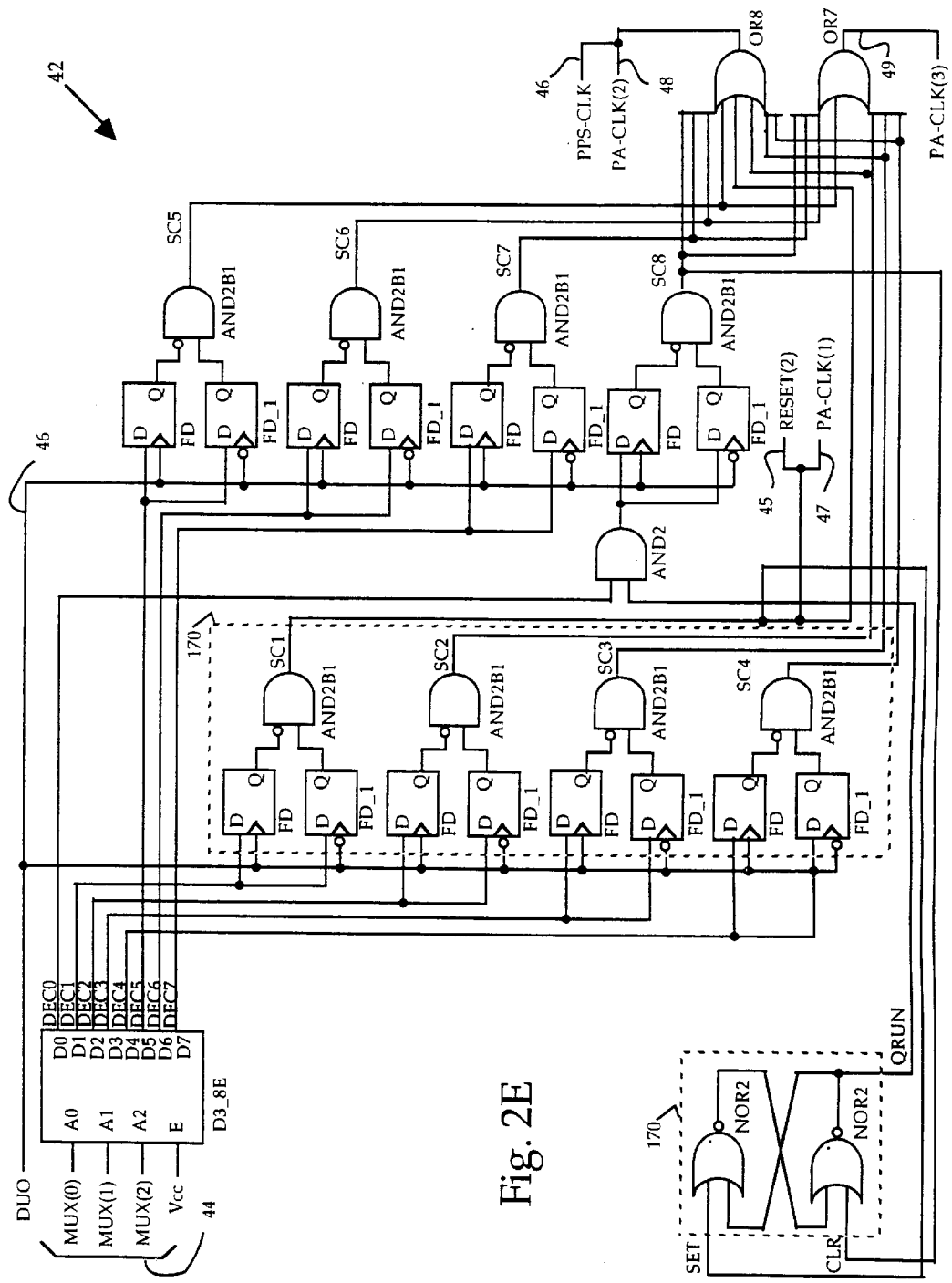
FIG. 2E is a block diagram of a preferred embodiment of sequence gate logic within the pulse sequencer.

Referring now to FIG. 2E, a block diagram of a preferred embodiment of sequence gate logic 42 of the present invention is shown. The sequence gate logic 42 is comprised of a set of logic devices (preferably partially created in a Xilinx XC4000 series FPGA using the library elements D3_8E, AND2B1, FD, FD_1, NOR2, OR8, and OR7) operationally coupled as shown in FIG. 2E. The sequence gate logic 42 decodes eight states using a set of glitch guardian circuits 170, as shown in FIG. 2E. The decoding is temporally in order of the pulse count on line 44. The last pulse count state (i.e. (0, 0, 0)) is decoded exactly one time. The CLKs 46, 47, 48, 48 are generated by "ORing" the outputs of the set of glitch guardian circuits 170. Those skilled in the art of FPGA design will recognize that alternative embodiments of the sequence gate logic 42 replace the wired-ORs with wired-ANDs gates by using a DeMorganization of the local state decoders. The preferred sequence gate logic 42 includes an even number of negative-edge triggered flip-flops and positive-edge triggered flip-flops, affording a highly efficient dual flip-flop per CLB packaging strategy, where like-clocked flip-flops are conjoined.

Figure 3:
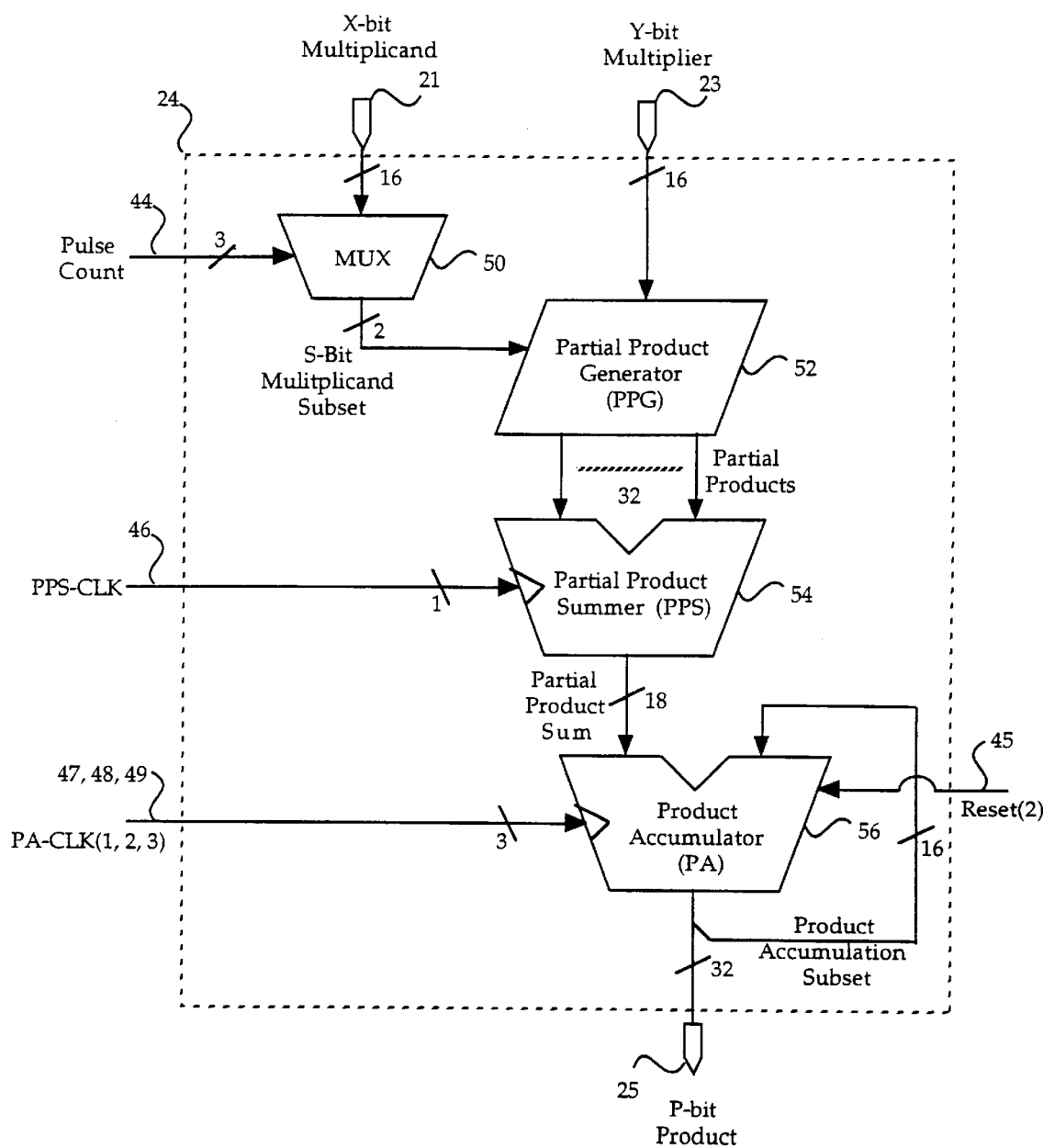
FIG. 3 is a block diagram of a preferred embodiment of functional logic of the present invention.

Referring now to FIG. 3, a block diagram of a preferred embodiment of functional logic 24 of the present invention is shown. The functional logic 24 comprises a multiplexor (MUX) 50, a partial product generator (PPG) 52, a partial product summer (PPS) 54 and a product accumulator (PA) 56. The MUX 50 receives the X-bit multiplicand on line 21 and outputs an S-bit multiplicand subset in response to the pulse count on line 44, as described in detail with reference to FIG. 4 below. The PPG 52 multiplies the Y-bit multiplier on line 23 with the S-bit multiplicand subset and outputs a set of partial products to the PPS 54, as described in detail with reference to FIG. 5 below. The PPS 54 combines the set of partial products and outputs a partial product sum to the PA 56 in response to the PPS-CLK 98 on line 46, as described in detail with reference to FIG. 6 below. The PA 56 receives a Reset(2) pulse 107 (ref. FIG. 8) on line 45 from the start logic 36, and in response resets its internal flip-flops (FFs) to zero. Prior to the receipt of this Reset(2) pulse 107, a previous P-bit product remains on line 25. The PA 56 generates a product accumulation by adding the partial product sum to a subset of the product accumulation's bits and outputs a P-bit product on line 25 in response to the PA-CLK(1, 2, 3) 99, 100, 101 (ref. FIG. 8) on lines 47, 48, 49, as described in detail with reference to FIG. 7 below. A complete X-bit by Y-bit multiplication is performed by the functional logic 24 after each S-bit multiplicand subset has been multiplied by the Y-bit multiplier and accumulated by the PA 56.

Figure 4:
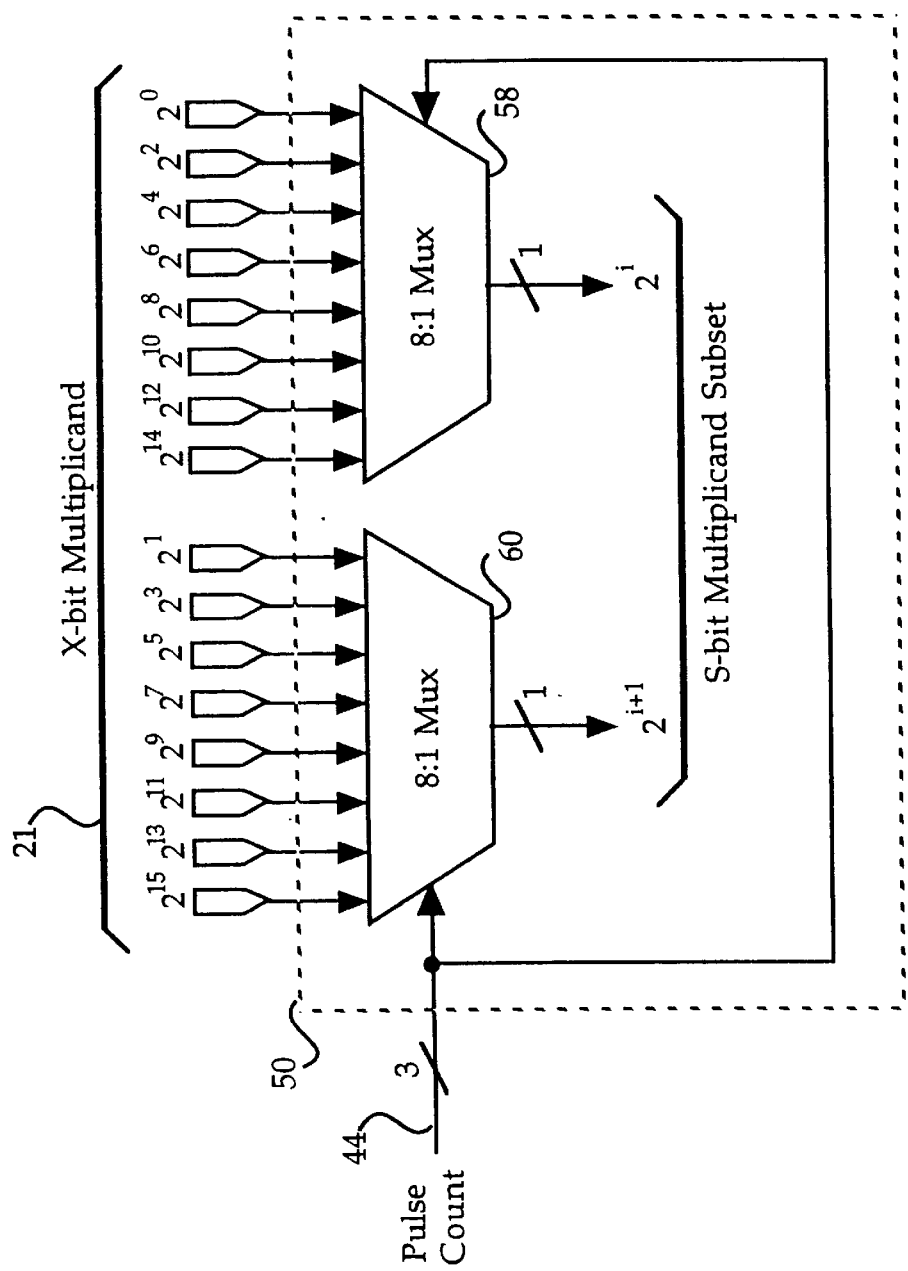
FIG. 4 is a block diagram of a preferred embodiment of a multiplexor within the functional logic.

Referring now to FIG. 4, a block diagram of a preferred embodiment of the MUX 50 within the functional logic 24 is shown. The MUX 50 is comprised of a first MUX 58 and a second MUX 60. Each MUX 58, 60 is coupled to the input buffer 22 via line 21, such that each receives half of the X-bit multiplicand. The first MUX 58 receives the even multiplicand bits (i.e. $2^0, 2^2, \ldots 2^{14}$ for a 16-bit multiplicand), while, the second MUX 60 receives the odd multiplicand bits (i.e. $2^1, 2^3, \ldots 2^{15}$ for a 16-bit multiplicand). Each MUX 58, 60 receives the pulse count over line 44. During the course of an X-bit by Y-bit multiplication, the pulse count is incremented from the initial pulse count up to and including the largest pulse count. In the case of a 16-bit multiplicand, the initial pulse count preferably corresponds to (0, 0, 1) on the line 44, where "1" is the LSB, and the largest pulse count preferably corresponds to (0, 0, 0). The pulse count thus preferably transitions from (0, 0, 1) to (0, 1, 0), (0, 1, 1), (1, 0, 0), (1, 0, 1), (1, 1, 0), (1, 1, 1), and then (0, 0, 0).

The first and second MUX's 58, 60 output an S-bit multiplicand subset to the PPG 52. Thus a 2-bit multiplicand subset ($2^i$ and $2^{i+1}$) is sent to the PPG 52, where bit $2^i$ is selected from the first MUX 58 and bit $2^{i+1}$ is selected from the second MUX 60. For a 16-bit by 16-bit multiplication, "S" equals "2" and "i" is an integer which preferably ranges from zero to fourteen as the pulse count ranges from (0, 0, 1) to (0, 0, 0).

Figure 5:
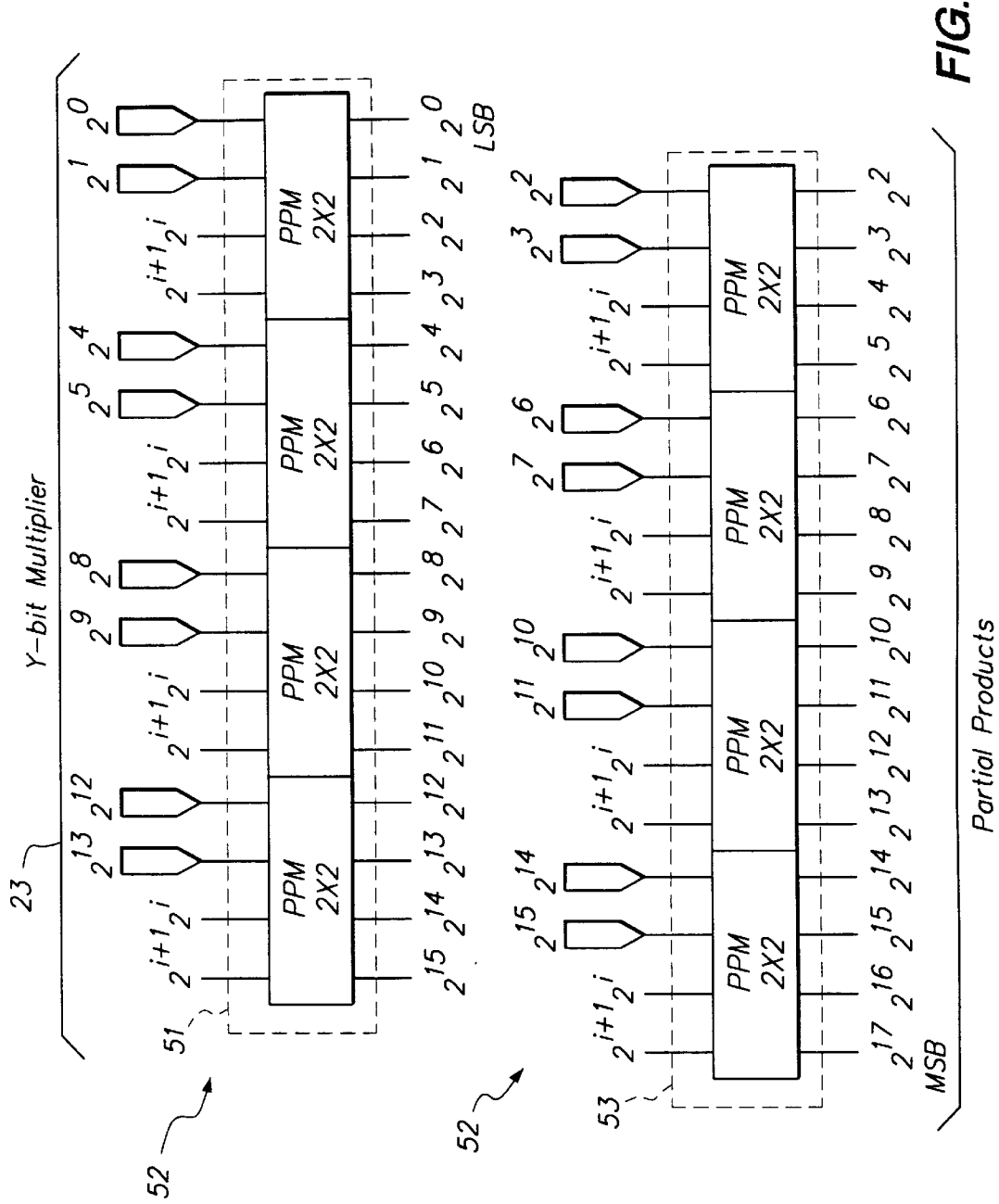
FIG. 5 is a block diagram of a preferred embodiment of a partial product generator within the functional logic.

Referring now to FIG. 5, a block diagram of a preferred embodiment of the PPG 52 within the functional logic is shown. The PPG 52 is comprised of a first set of partial product multipliers (PPMs) 51 and a second set of PPMs 53 whose inputs are coupled to receive the S-bit multiplicand subset from the first and second MUXs 58, 60 and the Y-bit multiplier on line 23. Outputs from the first and second set of PPMs 51, 53 are coupled to the PPS 54. For a 16-bit by 16-bit multiplication, each set of PPMs 51, 53 comprises four 2-bit by 2-bit PPMs operating in parallel, resulting in a total of 32-bits being sent to the PPS 54 after each multiplication operation. Each 2-bit multiplier pair from the 16-bit multiplier on line 23 is routed to one of the eight PPMs and is held constant during each partial product multiplication operation. For each pulse count, one 2-bit multiplicand subset (i.e. $2^i$ and $2^{i+1}$) is routed to each of the eight PPMs, starting with a first 2-bit multiplicand pair ($2^0$&$2^1$) when the pulse count is set to one and ending with a last 2-bit multiplicand pair ($2^{14}$&$2^{15}$) when the pulse count is set to zero. As shown in FIG. 5 for clarity, the column positions of the two 16-bit partial products, from the first and second set of PPMs 51, 53, are vertically aligned as their bits will be added by the PPS 54 as is conventionally known in the art. Bit $2^0$ is the least significant bit (LSB) and bit $2^{17}$ is the most significant bit (MSB). Those skilled in the art will recognize that while a 16-bit by 16-bit partial product generation has been described, the same description analogously applies to the general case of an X-bit by Y-bit partial product generation.

Figure 6:
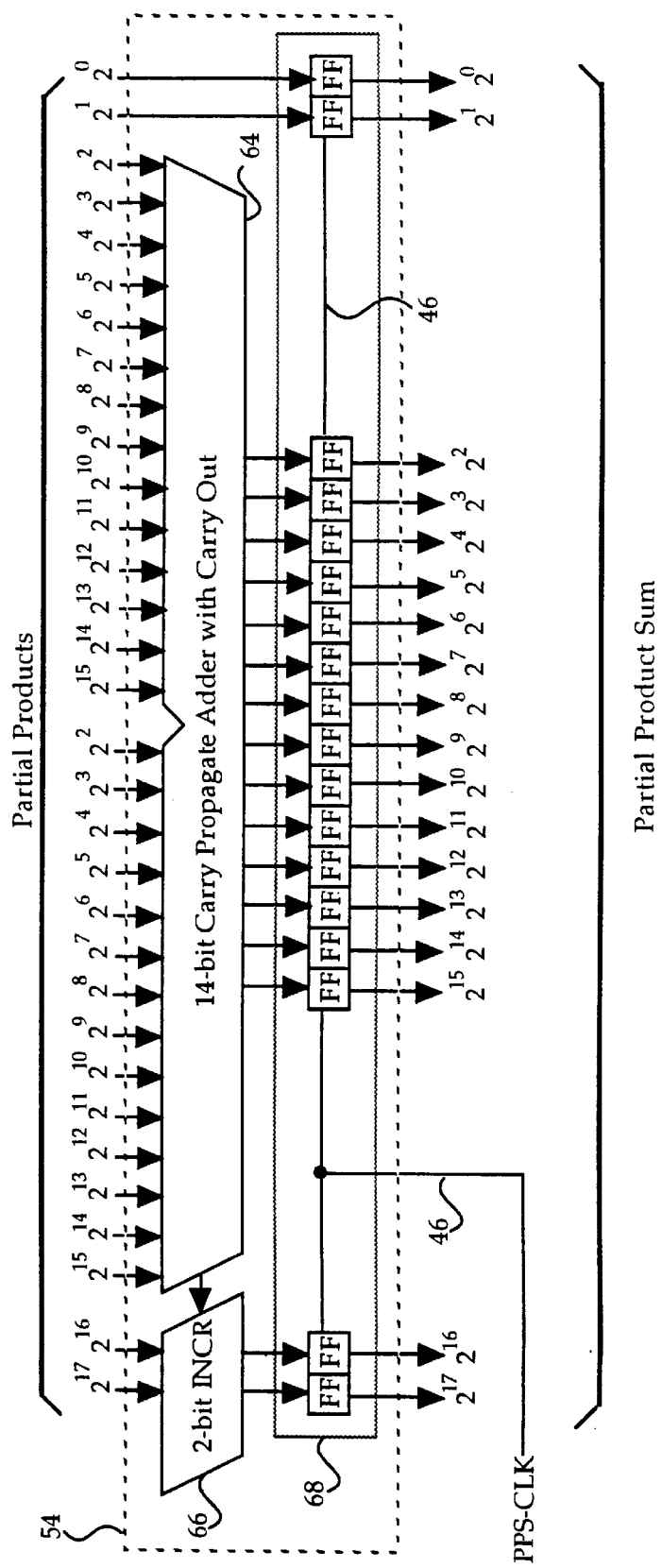
FIG. 6 is a block diagram of a preferred embodiment of a partial product summer within the functional logic.

Referring now to FIG. 6, a block diagram of a preferred embodiment of the PPS 54 within the functional logic 24 is shown. The PPS 54 comprises a PPS-adder 64, a PPS-incrementer 66, and a set of PPS-flip-flops 68. The PPS 54 is coupled to receive the two partial products generated by the PPG 52. The PPS 54 adds the two partial products and generates a partial product sum. In the case of a 16-bit by 16-bit multiplication: the two LSBs ($2^0$–$2^1$) from the first set of PPMs 51 are received directly by the PPS-flip-flops 68; the PPS-adder 64 adds 14 bits ($2^2$–$2^{15}$) from both the first and second set of PPMs 51, 53; the PPS-incrementer 66 accepts the two MSBs ($2^{16}$–$2^{17}$) from the second set of PPMs 53 and a carry-out from the 14-bit PPS-adder 64; and an 18-bit partial product sum ($2^0$–$2^{17}$) is generated and output. The partial product sum resulting from the addition is stored within the PPS-flip-flops 68 in response to a PPS-CLK 98 toggle on line 46.

Figure 7:
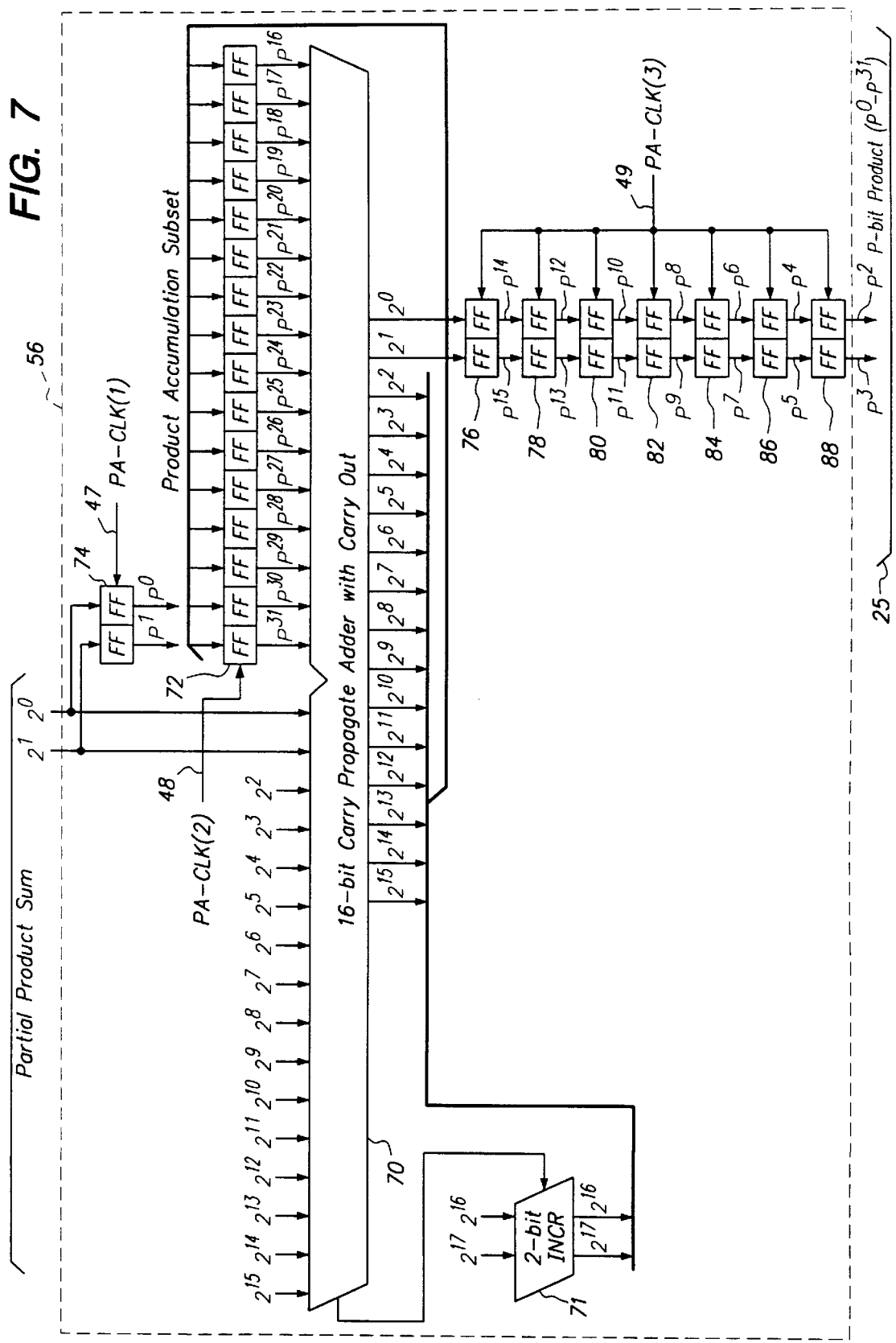
FIG. 7 is a block diagram of a preferred embodiment of a product accumulator within the functional logic.

Referring now to FIG. 7, a block diagram of a preferred embodiment of the PA 56 within the functional logic 24 is shown. The PA 56 comprises a PA-adder 70 coupled to receive the partial product sum from the PPS 54 and perform accumulations, a PA-incrementer 71, and a set of PA-flip-flops 72, 74, 76, 78, 80, 82, 84, 86, 88 for eventually storing the P-bit product. For a 16-bit by 16-bit multiplication: the PA-adder 70 is a 16-bit adder; the PA-incrementer 71 is a 2-bit incrementer; and the set of PA-flip-flops 72, 74, 76, 78, 80, 82, 84, 86, 88 comprise a first flip-flop set 72, a second flip-flop set 74, a third flip-flop set 76, a fourth flip-flop set 78, a fifth flip-flop set 80, a sixth flip-flop set 82, a seventh flip-flop set 84, an eighth flip-flop set 86, and a ninth flip-flop set 88 for storing a 32-bit product ($p^0$–$p^{31}$, where $p^0$ is the LSB and $p^{31}$ is the MSB). The two LSBs ($2^0$–$2^1$) from a first partial product sum received from the PPS 54 are stored in the second flip-flop set 74 in response to the rising edge of PA-CLK(1) 99 on line 47, thus becoming the 32-bit product's two LSBs ($p^0$–$p^1$). A 16-bit product accumulation subset (bits $2^2$ through $2^{17}$ from the output of the 16-bit adder 70 and the 2-bit incrementer 71) is stored in the first flip-flop set 72 in response to the rising edge of PA-CLK(2) 100 on line 48. The 16-bit adder 70 adds bits $2^0$ through $2^{15}$ of each partial product sum received from the PPS 54 to the 16-bit product accumulation subset to produce a product accumulation (bits $2^0$ through $2^{17}$ from the output of the 16-bit adder 70 and the 2-bit incrementer 71). Bits $2^2$ through $2^{17}$ of each product accumulation then become the product accumulation subset which is fed-back to the first flip-flop set 72, while product accumulation bits $2^0$ and $2^1$ are sequentially shifted after each product accumulation through the third through ninth flip flop sets 76, 78, 80, 82, 84, 86, 88 in response to a rising edge of the PA-CLK(3) 101 on line 49. Thus: after one PA-CLK(1) 99 toggle, bits $p^0$ and $p^1$ are stored in the second flip-flop set 74; after eight PA-CLK(2) 100 toggles, bits $p^{16}$ through $p^{31}$ are stored in the first flip-flop set 72; and after seven PA-CLK(3) 101 toggles, bits $p^2$ and $p^3$ are stored in the ninth flip-flop set 88, bits $p^4$ and $p^5$ are stored in the eighth flip-flop set 86, bits $p^6$ and $p^7$ are stored in the seventh flip-flop set 84, bits $p^8$ and $p^9$ are stored in the sixth flip-flop set 82, bits $p^{10}$ and $p^{11}$ are stored in the fifth flip-flop set 80, bits $p^{12}$ and $p^{13}$ are stored in the fourth flip-flop set 78, and bits $p^{14}$ and $p^{15}$ are stored in the third flip-flop set 76. The 32-bit product (bits $p^0$ through $p^{31}$) is then sent to the output buffer 26 over line 25.

Referring now to FIG. 8, a preferred timing diagram 89 of the operation of the present invention is shown. The timing waveforms shown in FIG. 8 are idealized and thus logical effects are deemed to occur at the instant of any state transition. The timing diagram 89 is comprised of a start signal 90, a QStart signal 128, a Start Pulse signal 130, a Feedback signal 132, a delay unit output signal 133, a halt signal 134, a RESET(1) signal 91, a MUX(0) signal 92, a MUX(1) signal 94, a MUX(2) signal 96, a PPS-CLK signal 98, a RESET(2) signal 97, a PA-CLK(1) signal 99, a PA-CLK(2) signal 100, a PA-CLK(3) signal 101, a product signal 102, a first start signal 104, a next start signal 106, a first PPS-CLK signal 108, a first PA-CLK(1) signal 109, a first PA-CLK(2) signal 110, a first PA-CLK(3) signal 112 and a product calculation time 114. The first start signal 104 is received by the pulse sequencer 34 over line 32 as was shown in FIG. 2A. In response to the first start signal 104, the start logic 36 initializes the MUX(0) 92 (the LSB), MUX(1) 94 and MUX(2) 96 (the MSB) signals respectively to (0, 0, 1) by sending the Reset(1) pulse 105 over line 43 and sending the MUX(0) 92, MUX(1) 94 and MUX(2) signals to the MUX 50 over line 44. In response, the MUX 50 selects the first 2-bit multiplicand pair ($2^0$–$2^1$) for a 16-bit by 16-bit multiplication, as is discussed above. The sequence gate logic 42 delays sending out the first PPS-CLK signal 108 to the PPS 54 until a first 18-bit partial product sum is present at the PPS-flip-flops' 68 inputs. After the first 18-bit partial product sum has been stored in the PPS-flip-flops 68, the MUX(0) 92, MUX(1) 94 and MUX(2) signals are incremented to a next state (i.e. (0, 1, 0)) in preparation for a next 18-bit partial product sum. The sequence gate logic 42 also delays sending out the first PA-CLK(1) signal 109 over line 47 until the first 18-bit partial product sum is present at the second flip-flop set's 74 inputs. Just before the PA-CLK(1) pulse 109 is sent over line 47, the start logic 36 generates the Reset(2) pulse 107 over line 45 to clear out the previous P-bit PRODUCT 102. The PA-CLK(1) 99 is toggled once per each complete 16-bit by 16-bit multiplication operation. The first PA-CLK(2) signal 110 over line 48 is generated only after a first 16-bit product accumulation subset is present at the first flip-flop set's 72 inputs, after which the PA-CLK(2) 100 is toggled each time a next 16-bit product accumulation subset is present at the first flip-flop set's 72 inputs. The PA-CLK(2) 100 is toggled eight times per each complete 16-bit by 16-bit multiplication operation. The first PA-CLK(3) signal 112 over line 49 is generated only after a second 18-bit product accumulation is present at the third flip-flop set's 76 inputs, after which the PA-CLK(3) 101 is toggled each time a next 18-bit product accumulation is present at the third flip-flop set's 72 inputs. The PA-CLK (3) 101 is toggled seven times per each complete 16-bit by 16-bit multiplication operation. Due to the known propagation delays present in a physical device embodying the present invention, the PRODUCT 102 will be known to be calculated within the product calculation time 114. As a result, an earliest time after the first start signal 104 that the second start signal 106 may be sent to the pulse sequencer 34 is after the PRODUCT signal 102 has stabilized. While only a 16-bit by 16-bit multiplication has been described, those skilled in the art will recognize that an X-bit by Y-bit multiplication may be effected in a similar manner.

Figures 1, 9A:
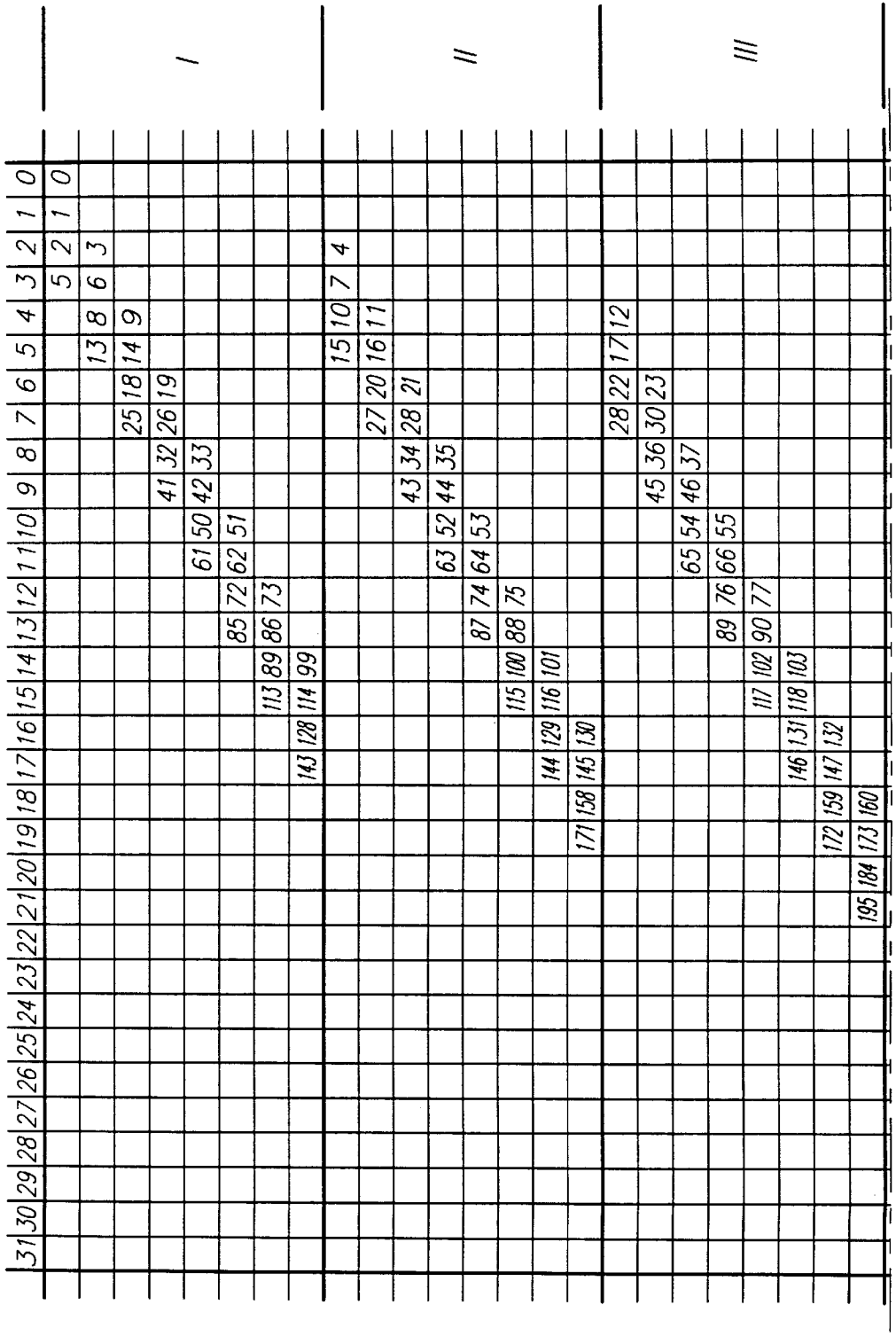
FIG. 9A is a matrix showing preferred partial product additions for a 16-bit by 16-bit multiplication of the present invention.

Referring now to FIG. 9A, a matrix of preferred partial product additions for a 16-bit by 16-bit multiplication performed by the present invention is shown. For the 16-bit by 16-bit multiplication, the PPS 54 goes through eight summations and the PA 56 goes through seven accumulations, finally resulting in a 32-bit product output over line 25 to the output buffer 26, as discussed above. At the top of the matrix, one column for each bit of the 32-bit product is shown, with the LSB being $2^0$ and the MSB being $2^{31}$. Referring to the portions of the matrix labeled "I, II, III, IV, V, VI, VII" and "VIII," an alignment of the eight partial product multipliers 62 within the PPG 52 is shown. In portion "I" bits $2^0$ and $2^1$ of the 16-bit multiplicand are multiplied with the 16-bit multiplier; in portion "II" bits $2^2$ and $2^3$ of the 16-bit multiplicand are multiplied with the 16-bit multiplier; and so on until in portion "VIII" bits $2^{14}$ and $2^{15}$ of the 16-bit multiplicand are multiplied with the 16-bit multiplier. The PA 56 adds all eight portions in the manner indicated within the matrix, resulting in the 32-bit product.

Referring now to FIG. 9B, a matrix of preferred partial product additions for an 8-bit by 8-bit multiplication performed in accordance with the present invention is shown.

For the 8-bit by 8-bit multiplication, the PPS 54 would be designed to go through four summations and the PA 56 through three accumulations, finally resulting in a 16-bit product output over line 25 to the output buffer 26, as discussed above. At the top of the matrix, one column for each bit of the 16-bit product is shown, with the LSB being $2^0$ and the MSB being $2^{15}$. Referring to the portions of the matrix labeled "I, II, III" and "IV," an alignment of the now four partial product multipliers 62 within the PPG 52 is shown. In portion "I" bits $2^0$ and $2^1$ of the 8-bit multiplicand are multiplied with the 8-bit multiplier; in portion "II" bits $2^2$ and $2^3$ of the 8-bit multiplicand are multiplied with the 8-bit multiplier; and so on until in portion "IV" bits $2^6$ and $2^7$ of the 8-bit multiplicand are multiplied with the 8-bit multiplier. The PA 56 adds four portions in the manner indicated within the matrix, resulting in the 16-bit product.

Figure 10:
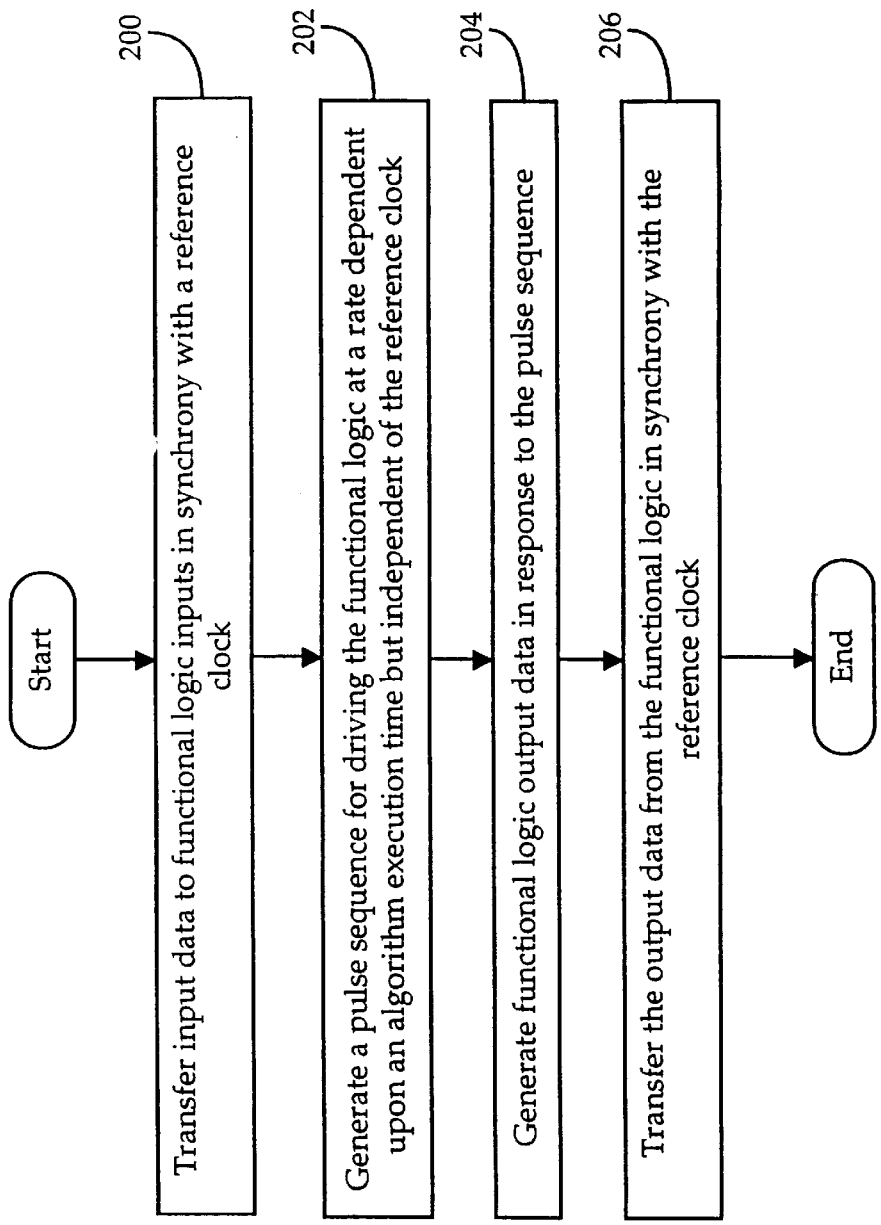
FIG. 10 is a flowchart of a preferred method for self-timed algorithmic execution.

Referring now to FIG. 10, a flowchart of a preferred method for self-timed algorithmic execution is shown. The preferred method begins in step 200 where a toggle from the reference clock while the input enable on line 29 is set to logic "1" causes the input buffer 22 to transfer the input data over lines 21 and 23 to the functional logic 24 inputs in synchrony with the reference clock toggle, in the manner described above. Next, in step 202 and in response to the START signal's 90 transition from logic "0" to logic "1" on line 32, the pulse sequencer 34 generates a maximal-rate pulse sequence over line 33, for driving the functional logic 24 at a rate dependent upon an algorithm execution time for the functional logic 24 but independent of the reference clock on line 28. Step 202 is described in detail in FIG. 11. In step 204, the functional logic 24 generates output data on line 25 in response to the maximal-rate pulse sequence on line 33. Step 204 is described in detail in FIG. 12. In step 206, the output data is transferred from the functional logic 24 over line 25 and into the output buffer 26 in synchrony with and in response to a toggle from the reference clock on line 28, while the output enable on line 31 is set to logic "1," as is described above. After step 206, the preferred method ends.

Figure 11:
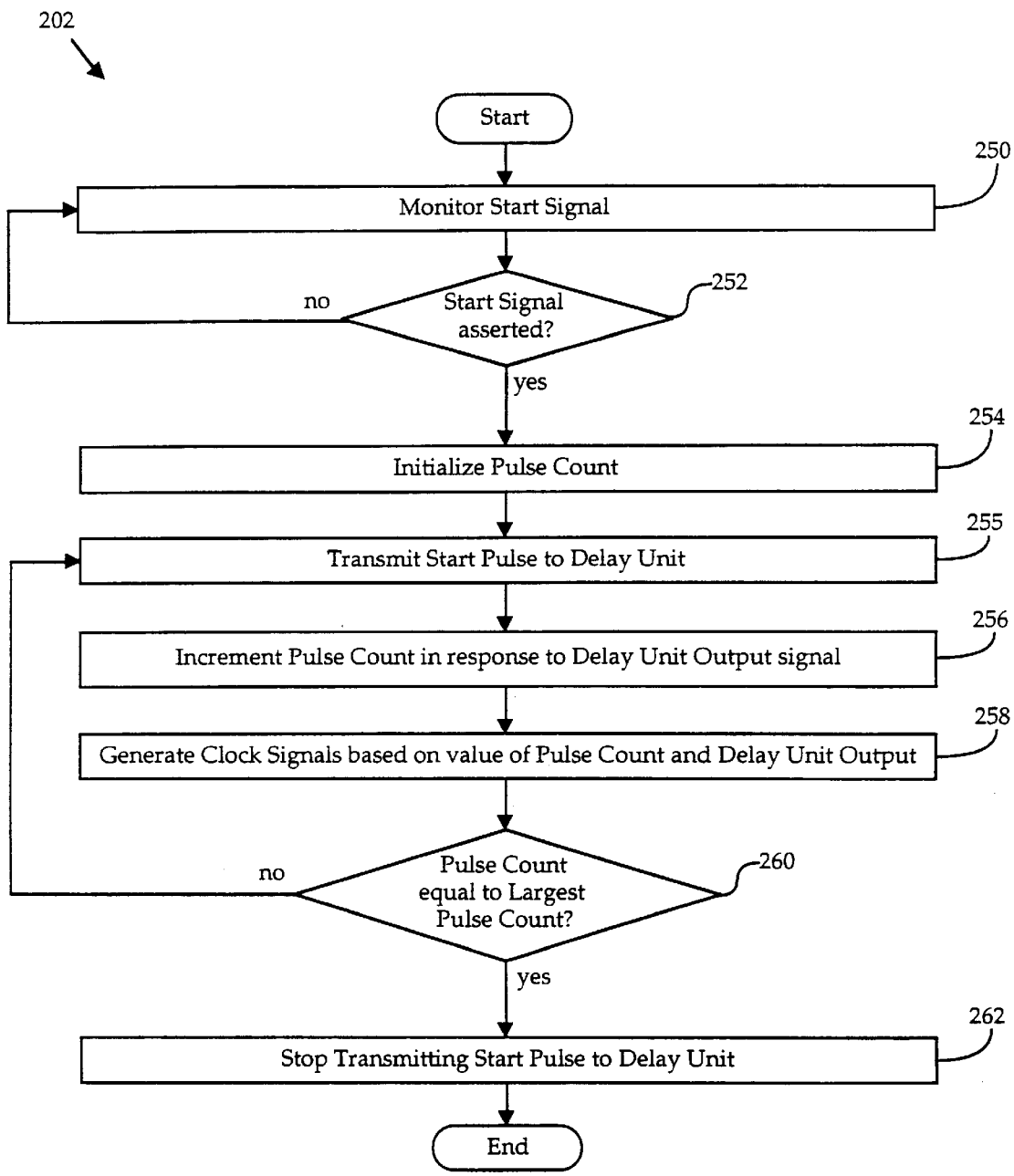
FIG. 11 is a flowchart of a preferred method for generating a pulse sequence.

Referring now to FIG. 11, a flowchart of a preferred method for generating a pulse sequence (step 202 of FIG. 10) is shown. The preferred method begins in step 250 with the start logic 36 monitoring the state of the start signal 90 on line 32 and the halt signal on line 41. In step 252, if the start signal 90 transitions to logic "1" while the halt signal remains set to logic "0", then the method proceeds to step 254, else the method returns to step 250. In step 254 the start logic 36 initializes the pulse counter 40, as discussed above. In step 255 the start logic 36 transmits a start pulse to the delay unit 38, as described above. Next in step 256 the pulse counter 40 increments the pulse count signal (i.e. MUX(0) 92, MUX(1) 94 and MUX(2) 96 for a 16-bit by 16-bit multiplication) in response to the delay unit output signal 133, as described above. The position within the delay unit 38 at which the delay unit output signal 133 is tapped may be varied so as to phase-align the pulse sequencer's 34 timing pulses with external circuitry coupled to the apparatus 20. In step 258, the sequence gate logic 42 generates the PPS-CLK signal 98 and the PA-CLK signals 99, 100, 101 in response to the pulse count signal, in the manner described above. In step 260, if the pulse count signal is equal to a largest pulse count signal, then the method proceeds to step 262, else the method returns to step 256. In step 262, the pulse counter 40 stops transmitting start pulses to the delay unit 38 by setting the halt signal on line 41 to logic "1." After step 262, the preferred method ends.

Figure 12:
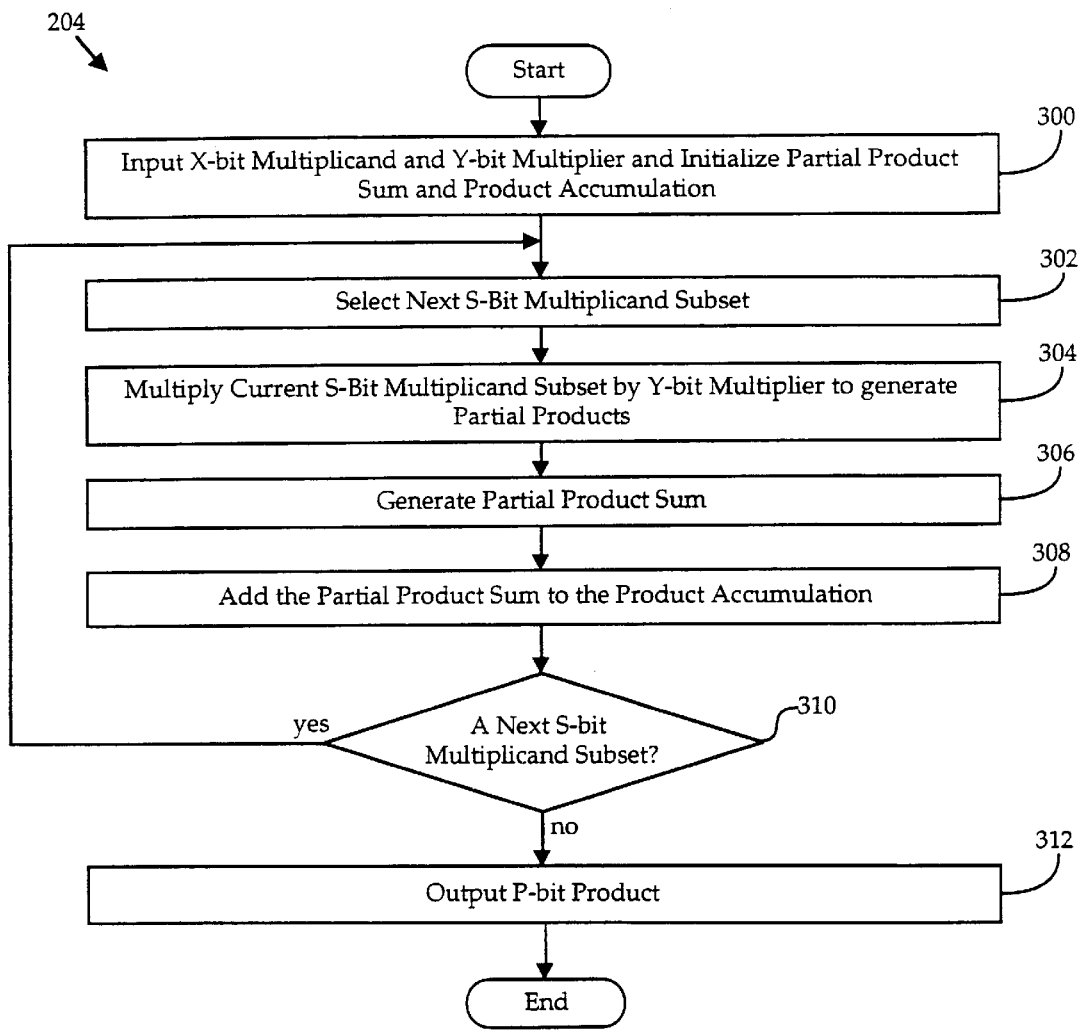
FIG. 12 is a flowchart of a preferred method for generating output data in response to the pulse sequence.

Referring now to FIG. 12, a flowchart of a preferred method for generating output data in response to the pulse sequence (step 204 of FIG. 12) is shown. The preferred method begins in step 300 with the MUX 50 inputting the X-bit multiplicand, the PPG 52 inputting the Y-bit multiplier, and the start logic 36 initializing the partial product sum and the product accumulation to zero, as described above. In step 302, the MUX 50 selects a next S-bit multiplicand subset, in the manner described above. In step 304 the PPG 52 multiplies a current S-bit multiplicand subset (i.e. the current subset is the next subset that was selected in step 302) by the Y-bit multiplier to generate the partial products sent to the PPS 54 as described above. Next in step 306 the PPS 54 generates the partial product sum and sends it to the PA 56 in the manner described above. In step 308, the PA 56 adds the partial product sum to the product accumulation as described above. In step 310, if a next S-Bit Multiplicand Subset has yet to be multiplied with the Y-bit multiplier, the method returns to step 302, else the method proceeds to step 312. In step 312, the PA 56 outputs a P-bit product to the output buffer 26. After step 312, the preferred method ends.

The present invention is preferably used within the context of a computing system. In the prior art, circuits designed to provide high-speed implementations of particular algorithms are constructed of multiple circuitry layers. Each circuitry layer receives a set of signals, performs a particular set of operations, and outputs a set of results in synchrony with a reference clock. Signals are transferred from one circuitry layer to another. Such prior art circuit designs often require many circuitry layers, undesirably necessitating the use of a large number of hardware resources. In contrast to the prior art, the present invention implements an algorithm by reusing a minimal number of hardware resources over and over at a maximal, self-timed rate to generate a result. That is, the same set of hardware resources is used repeatedly following receipt of the start signal through the generation of the halt signal to produce a result. The present invention provides a means for implementing an algorithm using significantly fewer hardware resources than required by prior art high-speed circuits, without suffering from any significant result-generation rate penalty. This is particularly advantageous when implementing one or more versions of the present invention in an RLD.

One skilled in the art will recognize that the present invention described above yields many other advantages over currently-existing logic designs. The present invention is particularly advantageous in view of current asynchronous logic designs. For instance, the present invention: does not require the generation of "completion signals" upon completing operational tasks; has known and predictable completion times; does not require external clocking elements but instead has its own integral pulse sequencer timing element; has completion times which are data independent; may synchronously interface with external circuitry; can coherently phase data exchanges with external circuitry; only adds additional localized circuit complexity when delay is added to its timing elements; is very easy to encapsulate within synchronous external circuitry; and affects the performance of only a localized set of circuitry instead of an entire system of external circuitry.

While the present invention has been described with reference to certain preferred embodiments, those skilled in the art will recognize that various modifications may be provided. Such modifications may yield alternate embodiments of the present invention. For example, the delay unit 38 could be designed to continuously recycle a pulse following RLD configuration, thereby eliminating the start logic 36. In such an embodiment, an RS flip-flop could enable a multiplexor to pass the delay unit output signal to the pulse counter 40 and sequence gate logic 42 in response to the start signal. Those skilled in the art will also recognize that the functional logic is not limited to the case of a self-timed multiplier. The functional logic could be modified to provide functions including, but not limited to, a self-timed divider, a self-timed convolver, or a self-timed signal processor. Variations upon and modifications to the preferred embodiments are provided for by the present invention, which is limited only by the following claims.

What is claimed is:

1. An apparatus for self-timed algorithmic execution in a globally synchronous, locally asynchronous system, the apparatus comprising:

a functional logic set coupled to receive input data at a first rate, for generating output data at a second rate independent of the first rate, and coupled to transmit the output data at the first rate; and a self-timed pulse sequencer, for generating a self-timed pulse sequence corresponding to the second rate, the pulse sequencer coupled to control the functional logic;

wherein:

the functional logic set and the self-timed pulse sequencer operate in a globally synchronous, locally asynchronous manner; and the timing of the pulse sequence is independent of the timing of the functional logic set.

2. The apparatus of claim 1, wherein:

the functional logic set has a predicted execution time; and the second rate is a maximal rate based upon the predicted execution time.

3. The apparatus of claim 1, wherein the functional logic is located sufficiently proximate to the self-timed pulse sequencer within a set of hardware resources as to respond in substantially identical manner as does the self-timed pulse sequencer to operating parameter variations of the hardware resources.

4. The apparatus of claim 1, wherein the pulse sequencer comprises a delay unit that generates a self-timed oscillation.

5. The apparatus of claim 4, wherein the delay unit comprises a set of serially coupled logic devices, each logic device having a predictable propagation delay.

6. The apparatus of claim 5, wherein the set of serially coupled logic devices comprises a set of carry logic elements.

7. The apparatus of claim 6, wherein the set of carry logic elements comprises carry-propagate logic within a reconfigurable logic device.

8. The apparatus of claim 4, wherein the pulse sequencer further comprises sequence gate logic for generating a set of clocking signals, the sequence gate logic coupled to receive a delay unit output signal and coupled to deliver the set of clocking signals to the functional logic to provide the second rate.

9. The apparatus of claim 8, wherein the pulse sequencer further comprises a pulse counter for generating a pulse count signal, the pulse counter coupled to receive the delay unit output signal.

10. The apparatus of claim 9, wherein the pulse sequencer further comprises start logic for generating a start pulse to initiate the operation of the delay unit.

11. The apparatus of claim 4, wherein the functional logic comprises a multiplier, the multiplier comprising:

a multiplexor coupled to receive a multiplicand;

a partial product generator coupled to receive a multiplier and a subset of bits within the multiplicand, for generating a set of partial products;

a partial product summer coupled to receive the set of partial products, for generating a partial product sum; and a product accumulator coupled to receive the partial product sum, for accumulating partial product sums to generate a product, wherein the multiplier is controlled according to the self-timed oscillation generated by the delay unit.

12. A pulse sequencer for operation in parallel with functional logic within a reconfigurable logic device, the pulse sequencer comprising a set of carry logic elements coupled to generate a self-timed oscillation.

13. An apparatus for controlling a self-timed algorithmic execution system, the self-timed algorithmic execution system comprising functional logic that receives input data and generates output data in globally synchronous, locally asynchronous operation in response to a set of control signals, the apparatus comprising:

start logic coupled to receive a start signal and in response generate a start pulse;

a delay unit coupled to receive the start pulse and in response generate a delay unit output signal and a feedback signal;

a pulse counter coupled to receive the delay unit output signal and in response generate a pulse count signal and selectively generate a halt signal; and sequence gate logic coupled to receive the pulse count signal and in response generate the set of control signals;

wherein:

the start logic is coupled to receive the feedback signal and in response regenerate the start pulse if the halt signal has not been generated; and the timing of the pulse count signal is independent of the timing of the functional logic.

14. A method for self-timed algorithmic execution in a globally synchronous, locally asynchronous system, for an apparatus comprising a functional logic set and a self-timed pulse sequencer, the method comprising the steps of:

receiving input data at a first rate;

generating a self-timed pulse sequence at a second rate independent of the first rate;

processing the input data at the second rate in response to the self-timed pulse sequence; and outputting the output data at the first rate;

wherein:

the functional logic set and the self-timed pulse sequencer operate in a globally synchronous, locally asynchronous manner; and the timing of the pulse sequence is independent of the timing of the functional logic set.

15. The method of claim 14, wherein the step of generating the pulse sequence is performed at a maximal rate dependent upon an execution time associated with the set of functional logic.

16. The method of claim 14, wherein:

the step of receiving input data is performed in synchrony with a reference clock;

the step of generating is performed at a self-timed rate independent of the reference clock; and the step of outputting is performed in synchrony with the reference clock.

17. The method of claim 16, wherein the step of generating comprises the steps of:
  generating a self-timed oscillation in response to a start signal; and
  maintaining the self-timed oscillation until a halt signal is received.

18. The method of claim 17, wherein the step of generating further comprises the steps of:
  generating a pulse count signal; and
  generating a set of control signals to control the processing of the input data at a rate corresponding to the period of the self-timed oscillation.

19. The method of claim 14, wherein the step of processing comprises the substeps of:
  generating a set of partial products by multiplying a multiplier and a subset of bits within a multiplicand;
  generating a partial product sum by adding the set of partial products;
  accumulating the partial product sum with a previous partial product sum; and
  repeating each substep within the step of processing until a multiplication product is generated.

20. An apparatus for self-timed algorithmic execution in a globally synchronous, locally asynchronous system, the apparatus comprising:
  means for receiving input data at a first rate;
  means for generating a self-timed pulse sequence at a second rate, the second rate independent of the first rate;
  means for processing the input data at the second rate to generate output data in response to the self-timed pulse sequence; and
  means for outputting the output data at the first rate;
  wherein:
  the means for generating a self-timed pulse sequence, the means for receiving input data, and the means for processing the input data, operate in a globally synchronous, locally asynchronous manner; and
  the timing of the pulse sequence is independent of the timing of the means for receiving input data.

21. The apparatus of claim 20, wherein the means for generating comprises means for generating a self-timed oscillation.

* * * * *